United States Patent [19]
Arakawa

[11] Patent Number: 5,751,621
[45] Date of Patent: May 12, 1998

[54] MULTIPLY-ADD UNIT AND DATA PROCESSING APPARATUS USING IT

[75] Inventor: Fumio Arakawa, Kodaira, Japan

[73] Assignee: Hitachi, Ltd., Tokyo, Japan

[21] Appl. No.: 559,160

[22] Filed: Nov. 13, 1995

[30] Foreign Application Priority Data

Nov. 17, 1994 [JP] Japan .................... 6-308200

[51] Int. Cl.$^6$ .................... G06F 7/38; G06F 7/00
[52] U.S. Cl. .................... 364/748.07; 364/715.1
[58] Field of Search .................... 364/715.01, 715.04, 364/715.1, 736, 750.5, 745, 748, 754, 757, 758, 766

[56] References Cited

U.S. PATENT DOCUMENTS

| | | | |
|---|---|---|---|
| 4,969,118 | 11/1990 | Montoye et al. | 364/748 |
| 5,373,461 | 12/1994 | Bearden et al. | 364/748 |
| 5,392,228 | 2/1995 | Burgess et al. | 364/715.04 |
| 5,471,410 | 11/1995 | Bailey et al. | 364/715.01 |
| 5,493,520 | 2/1996 | Schmookler et al. | 364/715.1 |

OTHER PUBLICATIONS

Digest of Papers—1994 Spring Compcon, "The PowerPC 603 Microprocessor: A High Performance, Low Power, Superscalar RISC Microprocessor", B. Burgess et al, pp. 300–306.

Primary Examiner—Chuong Dinh Ngo
Attorney, Agent, or Firm—Fay, Sharpe, Beall, Fagan, Minnich & McKee

[57] ABSTRACT

A multiply-add unit includes a digit alignment shift number and exponent generator unit, an addend digit alignment and sign adjusting unit, a multiplier array, a sticky-bit for addend lower digits generator unit, a leading digit detector unit, a carry propagate adder, an exponent normalizing unit, an addend higher digit incrementer, a sticky-bit generator unit, a normalizing shifter, a positive number conversion and rounder unit, and an exponent correction unit. The multiplier array is an array of carry save adders. The leading digit detector unit receives the two terms of carry and sum parts from the multiplier array, sequentially checks a digit pair of "0" to "1" at each corresponding digit position from the highest digit, and detects the leading non-zero digit of the absolute values depending upon what digit pair values are (11, 00, 10, 01) from higher to lower digit position.

16 Claims, 14 Drawing Sheets

INPUTS REPRESENTED BY TWO'S COMPLIMENT NOTATION

| MODE | MEANING |
|---|---|
| 00 | POSITIVE/NEGATIVE JUDGEMENT MODE |
| 10 | POSITIVE VALUE SEARCH MODE |
| 11 | NEGATIVE VALUE SEARCH MODE |
| 01 | SEARCH COMPLETE MODE |

FIG.10A

FOUR DIGITS OTHER THAN LOWEST

| mode[k-1] | input[4k-4] | input[4k-3] | input[4k-2] | input[4k-1] | mode[k] | found[4k-4] | found[4k-3] | found[4k-2] | found[4k-1] | |
|---|---|---|---|---|---|---|---|---|---|---|
| 00 | 00 | $\overline{11}$ | - | - | 01 | 0 | 1 | 0 | 0 | (1) |
|  |  | 11 | $\overline{11}$ | - | 01 | 0 | 0 | 1 | 0 | (2) |
|  |  |  | 11 | $\overline{11}$ | 01 | 0 | 0 | 0 | 1 | (3) |
|  |  |  |  | 11 | 11 | 0 | 0 | 0 | 0 | (4) |
|  | 01/10 | 00 | $\overline{11}$ | - | 01 | 0 | 0 | 1 | 0 | (5) |
|  |  | 11 | $\overline{11}$ | - | 01 | 0 | 0 | 0 | 1 | (6) |
|  |  |  | 11 | 11 | 0 | 0 | 0 | 0 |  | (7) |
|  |  | 01/10 | 00 | $\overline{11}$ | 01 | 0 | 0 | 0 | 1 | (8) |
|  |  |  | 11 | 11 | 0 | 0 | 0 | 0 |  | (9) |
|  |  |  | 01 | 00 | 11 | 0 | 0 | 0 | 0 | (10) |
|  |  |  | 10 | 01 | 00 | 0 | 0 | 0 | 0 | (11) |
|  |  |  |  | 10 |  |  |  |  |  | (12) |
|  |  |  |  | 11 | 10 | 0 | 0 | 0 | 0 | (13) |
|  |  | 11 | 00 | 10 | 0 | 0 | 0 | 0 |  | (14) |
|  |  |  |  | $\overline{00}$ | 01 | 0 | 0 | 0 | 1 | (15) |
|  |  | 11 | 00 | 00 | 10 | 0 | 0 | 0 | 0 | (16) |
|  |  |  |  | $\overline{00}$ | 01 | 0 | 0 | 0 | 1 | (17) |
|  |  |  | $\overline{00}$ | - | 01 | 0 | 0 | 1 | 0 | (18) |
|  | 11 | 00 | 00 | $\overline{00}$ | 10 | 0 | 0 | 0 | 0 | (19) |
|  |  |  |  | $\overline{00}$ | 01 | 0 | 0 | 0 | 1 | (20) |
|  |  |  | $\overline{00}$ | - | 01 | 0 | 0 | 1 | 0 | (21) |
|  |  | $\overline{00}$ | - | - | 01 | 0 | 1 | 0 | 0 | (22) |
| 01 | - | - | - | - | 01 | 0 | 0 | 0 | 0 | (23) |
| 10 | 00 | 00 | 00 | 00 | 10 | 0 | 0 | 0 | 0 | (24) |
|  |  |  |  | $\overline{00}$ | 01 | 0 | 0 | 0 | 1 | (25) |
|  |  |  | $\overline{00}$ | - | 01 | 0 | 0 | 1 | 0 | (26) |
|  |  | $\overline{00}$ | - | - | 01 | 0 | 1 | 0 | 0 | (27) |
|  | $\overline{00}$ | - | - | - | 01 | 1 | 0 | 0 | 0 | (28) |
| 11 | $\overline{11}$ | - | - | - | 01 | 1 | 0 | 0 | 0 | (29) |
|  | 11 | $\overline{11}$ | - | - | 01 | 0 | 1 | 0 | 0 | (30) |
|  |  | 11 | $\overline{11}$ | - | 01 | 0 | 0 | 1 | 0 | (31) |
|  |  |  | 11 | $\overline{11}$ | 01 | 0 | 0 | 0 | 1 | (32) |
|  |  |  |  | 11 | 11 | 0 | 0 | 0 | 0 | (33) |

FIG.10B

LOWEST FOUR DIGITS

| mode[n-1] | input[4n-4] | input[4n-3] | input[4n-2] | found[4n-4] | found[4n-3] | found[4n-2] | found[4n-1] | |
|---|---|---|---|---|---|---|---|---|
| 00 | 00 | $\overline{11}$ | - | 0 | 1 | 0 | 0 | (41) |
|  | 11 | $\overline{11}$ | - | 0 | 0 | 1 | 0 | (42) |
|  |  | 11 | $\overline{11}$ | 0 | 0 | 0 | 1 | (43) |
|  | 01/10 | 00 | $\overline{11}$ | 0 | 0 | 1 | 0 | (44) |
|  |  |  | 11 | 0 | 0 | 0 | 1 | (45) |
|  |  | 01/10 | - | 0 | 0 | 0 | 1 | (46) |
|  |  |  |  |  |  |  |  | (47) |
|  |  | 11 | 00 | 0 | 0 | 0 | 1 | (48) |
|  |  |  | $\overline{00}$ | 0 | 0 | 1 | 0 | (49) |
|  | 11 | 00 | 00 | 0 | 0 | 0 | 1 | (50) |
|  |  |  | $\overline{00}$ | 0 | 0 | 1 | 0 | (51) |
|  |  | $\overline{00}$ | - | 0 | 1 | 0 | 0 | (52) |
| 01 | - | - | - | 0 | 0 | 0 | 0 | (53) |
| 10 | 00 | 00 | 00 | 0 | 0 | 0 | 1 | (54) |
|  |  |  | $\overline{00}$ | 0 | 0 | 1 | 0 | (55) |
|  |  | $\overline{00}$ | - | 0 | 1 | 0 | 0 | (56) |
|  | $\overline{00}$ | - | - | 1 | 0 | 0 | 0 | (57) |
| 11 | $\overline{11}$ | - | - | 1 | 0 | 0 | 0 | (58) |
|  | 11 | $\overline{11}$ | - | 0 | 1 | 0 | 0 | (59) |
|  |  | 11 | $\overline{11}$ | 0 | 0 | 1 | 0 | (60) |
|  |  |  | 11 | 0 | 0 | 0 | 1 | (61) |

FIG.11A
FIG.11B
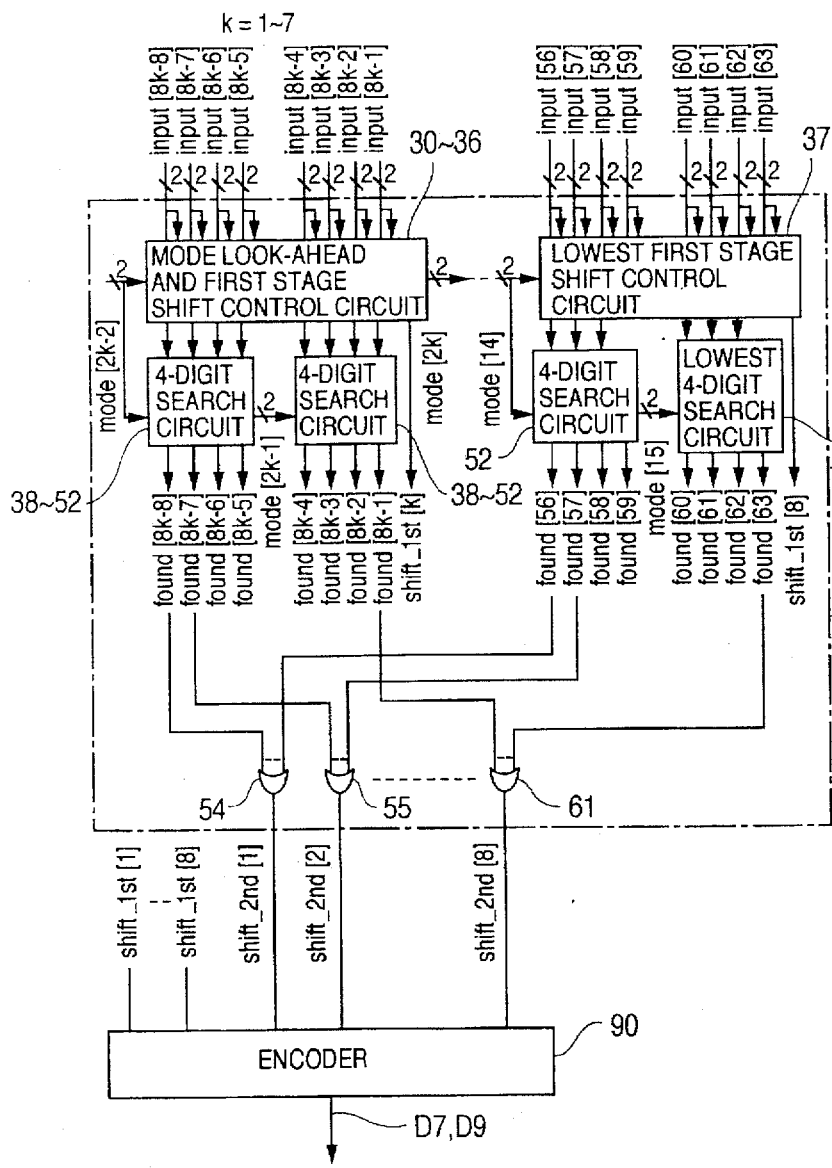
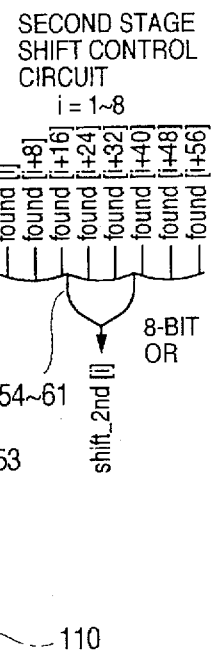

FIG.12A

EIGHT DIGITS OTHER THAN LOWEST

| mode [2k-2] | input [8k-8] | input [8k-7] | input [8k-6] | input [8k-5] | input [8k-4] | input [8k-3] | input [8k-2] | input [8k-1] | mode [2k] | shift_1st [k] | |
|---|---|---|---|---|---|---|---|---|---|---|---|
| 00 | 00 | 11 | 11 | 11 | 11 | 11 | 11 | 11 | 11 | 0 | (1) |
|    | 01 | 00 | 11 | 11 | 11 | 11 | 11 | 11 | 11 | 0 | (2) |
|    | 10 | 01 | 00 | 11 | 11 | 11 | 11 | 11 | 11 | 0 | (3) |
|    |    | 10 | 01 | 00 | 11 | 11 | 11 | 11 | 11 | 0 | (4) |
|    |    |    | 10 | 01 | 00 | 11 | 11 | 11 | 11 | 0 | (5) |
|    |    |    |    | 10 | 01 | 00 | 11 | 11 | 11 | 0 | (6) |
|    |    |    |    |    | 10 | 01 | 00 | 11 | 11 | 0 | (7) |
|    |    |    |    |    |    | 10 | 01 | 00 | 11 | 0 | (8) |
|    |    |    |    |    |    |    | 10 | 01 | 00 | 0 | (9) |
|    |    |    |    |    |    |    |    | 10 |    |   | (10) |
|    |    |    |    |    |    |    |    | 11 | 10 | 0 | (11) |
|    |    |    |    |    |    |    | 11 | 00 | 10 | 0 | (12) |
|    |    |    |    |    |    | 11 | 00 | 00 | 10 | 0 | (13) |
|    |    |    |    |    | 11 | 00 | 00 | 00 | 10 | 0 | (14) |
|    |    |    |    | 11 | 00 | 00 | 00 | 00 | 10 | 0 | (15) |
|    |    |    | 11 | 00 | 00 | 00 | 00 | 00 | 10 | 0 | (16) |
|    |    | 11 | 00 | 00 | 00 | 00 | 00 | 00 | 10 | 0 | (17) |
|    | 11 | 00 | 00 | 00 | 00 | 00 | 00 | 00 | 10 | 0 | (18) |
| 01 | -  | -  | -  | -  | -  | -  | -  | -  | 01 | 0 | (19) |
| 10 | 00 | 00 | 00 | 00 | 00 | 00 | 00 | 00 | 10 | 0 | (20) |
| 11 | 11 | 11 | 11 | 11 | 11 | 11 | 11 | 11 | 11 | 0 | (21) |
| otherwise |  |  |  |  |  |  |  |  | 01 | 1 | (22) |

FIG.12B

LOWEST EIGHT DIGITS

| mode [14] INPUT | shift_1st [8] OUTPUT |
|---|---|
| 00 | 1 |
| 10 | |
| 11 | |
| 01 | 0 |

MULTIPLY-ADD UNIT AND DATA PROCESSING APPARATUS USING IT

BACKGROUND OF THE INVENTION

1. Field of the Invention

The present invention relates to a multiply-add unit of a data processing apparatus such as a microprocessor, and more particularly to a multiply-add unit for executing a multiply-add instruction for normalizing a calculation result at high speed, and a data processing apparatus using such a multiply-add unit.

2. Description of the Related Art

An example of a conventional microprocessor which executes a multiply-add instruction for normalizing a calculation result is PowerPC 603 described in "The PowerPC 603 Microprocessor: A High Performance, Low Power, Superscaler RISC Microprocessor" (digest of papers SPRING COMPCON '94, pp. 300 to 306).

This processor detects the leading digit from a value obtained after carry propagate addition. If the addend flows higher than the product, the digits of the flowed addend are aligned with the lower digits, and incremented by the carry from the lower digits.

SUMMARY OF THE INVENTION

The processor described in the above paper detects the leading digit after carry propagate addition in accordance with a value obtained by the carry propagate addition. Therefore, the process time is a sum of the time required for the carry propagate addition and the time required for the leading digit detection, and a multiply-add calculation instruction cannot be executed at high speed.

Furthermore, if the addend flows higher than the product, the digits of the flowed addend are aligned with the lower digits, and incremented by the carry from the lower digits. Therefore, the number of digits used for the leading digit detection and normalization becomes large.

It is an object of the present invention to provide a multiply-add unit for executing a multiply-add instruction for normalizing a calculation result at high speed, and a data processing apparatus using such a multiply-add unit.

According to one aspect of the present invention, there is provided a multiply-add unit for performing a multiply-add calculation of a multiplicand, a multiplier, and an addend, which includes: a digit alignment shift number generator unit for obtaining a digit alignment shift number and an exponent of a multiply-add calculation result before normalization, in accordance with an exponent of the multiplicand, an exponent of the multiplier, and an exponent of the addend; an addend digit alignment unit for shifting and outputting a mantissa of the addend in accordance with the digit alignment shift number; a multiply-add calculation array for receiving a mantissa of the multiplicand, a mantissa of the multiplier, and a mantissa of the addend supplied from the addend digit alignment unit, performing a multiply-add calculation of these mantissas, and outputting two terms; a leading digit detector unit for receiving the two terms supplied from the multiply-add calculation array, and in accordance with the two terms, detecting a leading non-zero digit among absolute values of the mantissas of the multiply-add calculation result before normalization; a carry propagate adder unit for receiving the two terms from the multiply-add calculation array, in accordance with the two terms, performing a carry propagate addition operation in parallel with a leading digit detection operation of the leading non-zero digit detector unit, and outputting a mantissa of the multiply-add calculation result before normalization; a normalizing unit for normalizing a mantissa of the multiply-add calculation result before normalization supplied from the carry propagate adder unit in accordance with the leading digit detected by the leading digit detector unit, and obtaining a normalized mantissa of the multiply-add calculation result; and an exponent normalizing unit for normalizing the exponent of the multiply-add calculation result before normalization supplied from the digit alignment shift number generator unit in accordance with the leading digit detected by the leading digit detector unit, and obtaining a normalized exponent of the multiply-add calculation result.

As above, since the leading digit detection and carry propagate addition are performed in parallel, the shorter and of the carry propagate addition process and the leading digit detection process is contained in the longer process time of the two. Accordingly, the multiply-add calculation process can be performed at high speed.

According to a modification of the invention, the leading digit detector unit detects the leading digit with one digit error, and the multiply-add unit further includes means for selectively shifting the mantissa of the multiply-add calculation result after normalization, supplied from the normalizing unit by one digit, in accordance with the leading digit detected by the highest digit detector circuit.

As above, the structure of the leading digit detector unit can be simplified if the leading digit is detected while permitting one digit error.

According to another aspect of the invention, there is provided a multiply-add unit for performing a multiply-add calculation of a multiplicand, a multiplier, and an addend, which includes: a digit alignment shift number generator unit for obtaining a digit alignment shift number and an exponent of a multiply-add calculation result before normalization, in accordance with an exponent of the multiplicand, an exponent of the multiplier, and an exponent of the addend; an addend digit alignment unit for outputting a first mantissa of the addend essentially consisting of higher digits determined not to be subjected to a calculation by a multiply-add calculation array in accordance with the digit alignment shift number, among a mantissa of the addend, and shifting and outputting a second mantissa of the addend essentially consisting of bits excepting the first mantissa among the mantissa of the addend, in accordance with the digit alignment shift number; the multiply-add calculation array receiving a mantissa of the multiplicand, a mantissa of the multiplier, and the second mantissa of the addend supplied from the addend digit alignment unit, performing a multiply-add calculation of these mantissas, and outputting two terms; a carry propagate adder unit for receiving the two terms from the multiply-add calculation array, in accordance with the two terms, performing a carry propagate addition operation, and outputting a lower mantissa of the multiply-add calculation result before normalization; a leading digit detector unit for receiving either the two terms supplied from the multiply-add calculation array or the lower mantissa of the multiply-add calculation result before normalization and the digit alignment shift number, and in accordance with either the two terms or the lower mantissa, and the digit alignment shift number, detecting a leading non-zero digit among absolute values of the mantissas of the multiply-add calculation result before normalization; a normalizing unit for normalizing a lower mantissa of the multiply-add calculation result before normalization supplied from the carry propagate adder unit in accordance with the leading digit detected by the leading digit detector unit, and obtaining a normalized lower mantissa of the multiply-add calculation result; an addend higher digit incrementer for selectively incrementing the first mantissa of the addend supplied from the addend digit alignment unit, in accordance with a carry from the carry propagate adder unit; means for obtaining a normalized mantissa of the multiply-add calculation result from a logical sum between the normalized lower mantissa of the multiply-add calculation result supplied from the normalizing unit and the first mantissa of the addend incremented by the addend higher digit incrementer; and an exponent normalizing unit for normalizing the exponent of the multiply-add calculation result before normalization supplied from the digit alignment shift number generator unit in accordance with the leading digit detected by the leading digit detector unit, and obtaining a normalized exponent of the multiply-add calculation result.

As above, if the addend is larger than the product, the addend higher digits flowing higher than the product are processed without shifting the highest digit, the multiply-add calculation is performed between the addend digits other than the overflowed digits and the product, and thereafter the normalized result is added to the overflowed digits to obtain the final normalized multiply-add result. Accordingly, the leading digit detection and normalization of the addend higher digits overflowing higher than the product are not necessary, and the multiply-add calculation can be performed at high speed.

BRIEF DESCRIPTION OF THE DRAWINGS

FIGS. 10A and 10B are diagrams showing examples of operation logic of the search circuit shown in FIG. 8;

FIG. 11A is a block diagram showing another example of the structure of the search circuit of the leading digit detector unit shown in FIG. 8;

FIG. 11B is a diagram showing the structure of the second stage shift control circuit of the search circuit shown in FIG. 11A;

FIG. 12A is a diagram showing an example of operation logic of the mode look-ahead and first stage shift control circuit shown in FIG. 11A;

FIG. 12B is a diagram showing an example of operation logic of the lowest first stage shift control circuit shown in FIG. 11A;

DETAILED DESCRIPTION OF THE PREFERRED EMBODIMENTS

Figure 1:
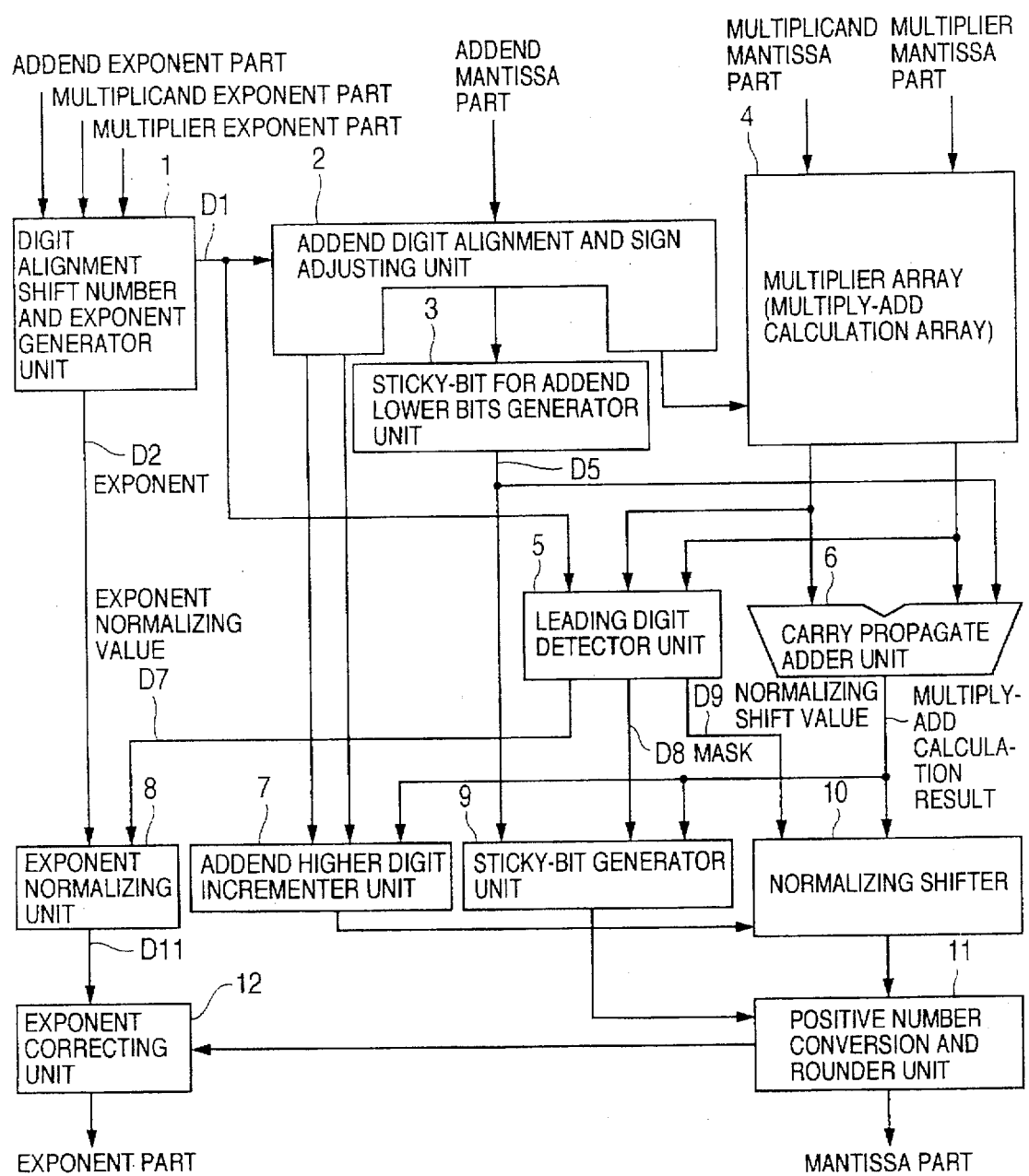
FIG. 1 is a block diagram showing the structure of a multiply-add unit according to an embodiment of the invention.

Embodiments of the multiply-add unit of this invention will be described with reference to the accompanying drawings.

In the following embodiments, elements having the same function are represented by identical reference numerals, and duplicate description thereof is omitted.

Multiply-add calculation in this invention is floating point calculation for calculating (multiplicand) × (multiplier) + (addend). Normalization is to shift a radix point to the right of the highest digit other than "0". For example, $0.001 \times 2^2$ is normalized to $1.000 \times 2^{-1}$.

FIG. 1 shows the structure of a multiply-add unit capable of performing multiply-add calculation at high speed, according to an embodiment of the invention. The multiply-add unit includes a digit alignment shift number and exponent generator unit 1, an addend digit alignment and sign adjusting unit 2, a sticky-bit for addend lower digits generator unit 3, a multiplier (multiply-add calculation) array 4, a leading digit detector unit 5, a carry propagate adder unit 6, an addend higher digit incrementer unit 7, an exponent normalizing unit 8, a sticky-bit generator unit 9, a normalizing shifter 10, a positive number conversion and rounder unit 11, and an exponent correcting unit 12.

The structure and operation of each part of the multiply-add unit shown in FIG. 1 will be described.

The digit alignment shift number and exponent generator unit 1 receives exponents of an addend, a multiplicand, and a multiplier, and generates a digit alignment shift number D1 and an exponent D2 of the multiply-add calculation result before normalization which are supplied to the addend digit alignment unit 2 and exponent normalizing unit 8.

The digit alignment shift number is generated in this embodiment by subtracting the addend exponent from a sum of the multiplicand exponent and multiplier exponent, i.e., the product exponent.

As the exponent D2 to be outputted to the exponent normalizing unit 8, the addend exponent is selected if the digit alignment shift number is "−3" or smaller, i.e., if the highest digit is always at any one of the addend higher bits, or the product exponent is selected if the digit alignment shift number is "−2" or larger, i.e., if the highest digit is not always at any one of the addend higher bits.

The addend digit alignment and sign adjusting unit 2 receives the addend mantissa and the digit alignment shift number D1, aligns the digits of the addend, and adjusts the sign. The addend digit alignment and sign adjusting unit 2 outputs digits corresponding to the product as the addend middle digits to the multiplier array 4, outputs digits that have flowed higher than the addend middle digits as the addend higher digits to the addend higher digits incrementer 9, and outputs digits that have flowed lower than the addend middle digits as the addend lower digits to the sticky-bit for addend lower digits generator unit 3.

Sign adjusting is performed by comparing the sign of the addend with the sign of the product of a multiplicand and a multiplier, and if the signs are different, by inverting 0s and 1s of respective digits and adding "1" in order to invert the sign of the addend and obtain the two's complement. In this embodiment, however, only inversion of 0s and 1s of the addend higher and middle digits is performed. The addend higher digits are not shifted to the lower digit side when the digit alignment is performed, so as to dispense with normalization shift at the normalizing shifter 10. If the addend higher digits are not shifted to the lower digit side, the lowest digit position of the addend higher digits changes with the number of digits of the addend higher digits. Therefore, the addend higher digit lowest position value is also outputted to the addend higher digit incrementer 7. The addend higher digits lowest position value is a value obtained by setting "1" to the lowest digit position of the addend higher digits. This value added with the addend higher digits can increment the addend higher digits.

The sticky-bit for addend lower digits generator unit 3 receives the addend lower digits from the addend digit alignment and sign adjusting unit 2, generates the sticky-bit D5 for addend lower digits, and outputs it to the carry propagate adder 6 and sticky-bit generator unit 9.

The sticky-bit is used when the calculation result is rounded. This sticky-bit is set if the digits other than the upper (n+1) digits of the calculation result before rounding is not "0", where n represents the number of digits of input data and the number of digits after rounding.

If the addend lower digit are not "0" digits, the digit cancelation by the multiply-add calculation is "1" digit at the maximum so that an output of the carry propagate adder 6 is at least 2n−2 digits.

If the digit alignment shift number is "−2" to "1", the cancelation of two digits or more occurs. In this case, the addend lower digit are "0" digits. Since the addend lower digits are used only for the sticky-bit generation, the value itself of the addend lower digits is not needed. Therefore, the addend lower digits are left as the sticky-bit for addend lower digits which takes "1" when the value of addend lower digits is not "0".

Although the addend digit alignment and sign adjusting unit 2 does not perform sign adjustment of the addend lower digits, the value of the sticky-bit for addend lower digits is correct because "0" does not change irrespective of whether the sign adjustment is performed or not.

The multiplier array 4 receives the multiplicand mantissa, multiplier mantissa, and addend middle digits supplied from the addend digit alignment and sign adjusting unit 2, calculates a sum of the product of the multiplicand mantissa and multiplier mantissa and the addend middle digits by using an array such as a carry save adder array or a redundant binary adder array, and outputs the result to the leading digit detector unit 5 and carry propagate adder 6.

The outputs of the multiplier array 4 are two values (two terms) which are added by the carry propagate adder 6 to obtain the mantissa of the multiply-add calculation result before normalization. These two terms are, for example, carry and sum parts if the multiplier array is a carry save adder array, and positive and negative number parts if the multiplier array is a redundant binary adder array.

In accordance with the digit alignment shift number D1 from the digit alignment shift number and exponent generator unit 1 and the outputs of the multiplier array 4, the leading digit detector unit 5 detects the leading digit other than "0", that is, the leading non-zero digit, from the absolute values of the multiply-add calculation result before normalization. In accordance with the detected result, an exponent normalizing value D7 is outputted to the exponent normalizing unit 8, a mask D8 for generating a sticky-bit is outputted to the sticky-bit generator unit 9, and a normalizing shift number D9 is outputted to the normalizing shifter 10. The leading digit is detected in the following manner.

If the digit alignment shift number is "−3" or smaller, the leading digit is at any one of the addend higher digits. If the product and addend have the same sign, a carry may be generated, and if they have different signs, a borrow may be generated.

If one digit error to the higher digit side is allowed when detecting the leading digit and the leading digit is determined by neglecting the presence of a carry or borrow, then the leading digit is at the highest digit of the addend higher digits if the product and addend have the same sign, and at the digit that is one digit lower than the highest digit of the addend higher digits if the product and addend have different signs.

If the digit alignment shift number is "−3" or smaller, an exponent outputted by the digit alignment shift number and exponent generator unit 1 is the addend exponent. Therefore, the exponent normalizing value is "0" if the product and addend have the same sign because the leading digit does not shift if the addend is used as a shift reference, and is "−1" if they have different signs because the leading digit moves one digit higher. The normalizing shift number takes a value obtained by inverting the sign of the digit alignment shift number if the product and addend have the same sign because a right shift is performed by the number of left shift digits of the addend, and takes a value obtained by adding "1" to the digit alignment shift number and inverting the sign of the addition result if they have different signs because the leading digit shifts one digit higher than the case of the same sign.

The normalizing shifter 10 extracts (n+2) digits starting from the digit that is one digit higher than the leading digit, where n is the number of digits after rounding. The sticky-bit is generated from the digits lower than the extracted value. Therefore, the mask for generating the sticky-bit can be obtained by setting "1" to the digits at the (n+2)-th digit and lower digits as counted downward from the leading digit, i.e., to the digits lower than the (n−1)-th digit of the leading non-zero digit.

If the digit alignment shift number is "−2" or larger, the leading non-zero digit detected from the absolute values is the output of the carry propagate adder 6, or at the lowest or second lowest digit of addend higher digits. The detailed method of detecting the leading non-zero digit in such a case will be later described. The exponent normalizing value and normalizing shift number are determined by a difference between the leading non-zero digit position and the radix point before normalization. The mask for generating the sticky-bit is generated in the manner described above by setting "1" to all the digits at the (n+1)-th digit and lower digits.

The carry propagate adder 6 adds the two values outputted from the multiplier array 4 to generate the mantissa of the multiply-add calculation result before normalization, and outputs it to the sticky-bit generator unit 9 and positive number conversion and rounder unit 11. In this case, if the product and addend have different signs and the sticky-bit for addend lower digits is "0", "1" is added at the lowest digit during the addition operation.

Addition of "1" to the lowest digit completes the sign negation process because the addend digit alignment and sign adjusting unit 2 have only inverted 0s and 1s of the addend middle and lower digits.

The reason why "1" is added only when the sticky-bit for addend lower digits is "0" is as follows. Assuming that the 0s and 1s of the addend lower digits are inverted and "1" is added to the lowest digit, a carry propagates to the addend middle digits if all the addend lower digits become "1s" after inversion, i.e., if all the addend lower digits are "0s" before inversion. This corresponds to the sticky-bit for addend lower digits of "0". If a carry does not propagate, it is not necessary to add "1".

The addend higher digit incrementer 7 receives the addend higher digit and addend higher digit lowest position value from the addend digit alignment and sign adjusting unit 2 and the carry from the carry propagate adder 6, and selects a sum of the addend higher digits and the addend higher digits lowest position value if the carry is "1" or the addend higher bits if the carry is "0". Further, in order to align the selected value with the value extracted by the normalizing shifter 10, if the product and addend have the same sign or different signs, the leading digit of the addend higher digits is aligned with the digit that is one digit lower than the leading digit of the output of the addend higher digit incrementer 7 or with the leading digit of this output. If the digit alignment shift number is "−2" or larger, this method may result in a misalignment with the digit of the value extracted by the normalizing shifter 10. Therefore, the number of normalization shifts from the leading digit detector unit 5 is checked and if the number of normalization shifts is "1" or "2", the leading digit of the addend higher bits is aligned with the digit that is one digit lower than the leading digit of the output of the addend higher bit incrementer 7 or with the highest digit of this output. If the number of normalization shifts is neither "1" nor "2", "0" is outputted from the addend higher bit incrementer 7.

The exponent normalizing unit 8 adds the exponent normalizing value supplied from the leading digit detector unit 5 to the exponent supplied from the digit alignment shift number and exponent generator unit 1, i.e., the exponent of the multiply-add calculation result before normalization, and outputs the addition result as the normalized exponent D11 to the exponent correcting unit 12.

The sticky-bit generator unit 9 masks the mantissa of the multiply-add calculation result before normalization supplied from the carry propagate adder 6 with the mask supplied from the leading digit detector unit 5 to obtain a logical sum, further obtains a logical sum between the first mentioned logical sum and the sticky-bit for addend lower digits, and outputs the latter logical sum to the positive number conversion and rounder unit 11 as the sticky-bit.

The normalizing shifter 10 normalizes the mantissa of the multiply-add calculation result before normalization supplied from the carry propagate adder 6 by using the normalizing shift number supplied from the leading digit detector unit 5, obtains a logical sum between the normalized mantissa and the output of the addend higher digits incrementer 7, and outputs the logical sum to the positive number conversion and rounder unit 11.

The positive number conversion and rounder unit 11 receives the output of the normalizing shifter 10, converts it to a positive number and rounds the positive number, and outputs the final mantissa of the normalized multiply-add calculation result. The normalizing process is performed if the addend higher digits are negative, or if the addend higher digits are "0" and the output of the carry propagate adder 6 is negative. In this case, 0s and 1s are inverted, and "1" is added only when the sticky-bit is "0", similar to the case of the carry propagate adder 6.

The exponent correcting unit 12 corrects the error of the exponent to be caused by a carry generated by positive number conversion and rounding, and outputs the final exponent of the normalized multiply-add calculation result.

Figure 2:
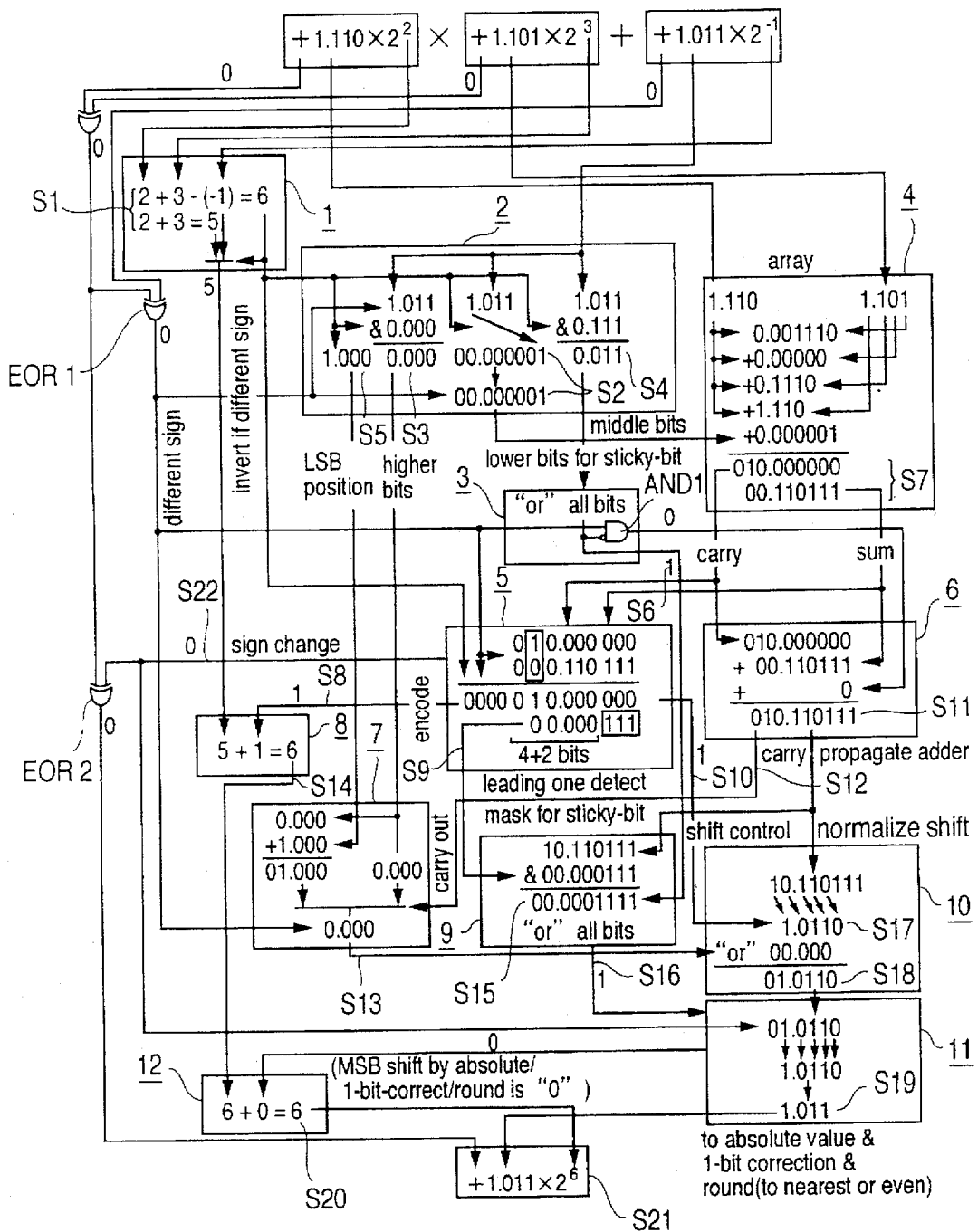
FIG. 2 is a diagram illustrating the process flow at each constituent element shown in FIG. 1 wherein an equation of multiply-add is calculated by the multiply-add unit shown in FIG. 1.

Next, the operation of the multiply-add will be described by using values having a 4-bit mantissa, with reference to FIGS. 1 to 3.

First, calculating the following equation (1) will be described with reference to FIGS. 1 and 2. FIG. 2 illustrates the process flow at each constituent element shown in FIG. 1 when the equation (1) is calculated by the multiply-add unit shown in FIG. 1.

$$(1.110\times2^2)\times(1.101\times2^3)+(1.011\times2^{-1}) \qquad (1)$$

First, the digit alignment shift number and exponent generator unit 1 generates a shift number (digit alignment shift number) necessary for the digit alignment between a product and an addend, in accordance with the exponents of the equation (1), i.e., 2+3−(−1)=6. In this case, since the digit alignment shift number "6" is neither equal to nor smaller than "−2", a sum "5" of the exponents of the product terms is selected instead of the addend exponent "−1" and outputted (Step S1 in FIG. 2).

Next, the addend digit alignment and sign addition unit 2 right-shifts (toward the lower digit side) the mantissa of the addend by 6 digits to obtain 0.000001011, in accordance with the digit alignment shift number obtained at Step S1. First, addend middle digits 00.000001 are obtained from the digits 0.000001011 (eight digits are considered as effective numbers since the multiply operation is 4 digits×4 digits) (Step S2).

Addend higher digits 0.000 are obtained (Step S3) as a logical product of the mantissa 1.011 of the addend and a mask 0.000 (since no digit of the mantissa 1.011 flowing higher is generated by the 6-digit right shift, the mask digits are all 0s). Furthermore, addend lower digits 0011 are obtained (Step S4) as a logical product of the mantissa 1.011 of the addend and a mask 0.111 (since the lowest three digits of the mantissa 1.011 flowing lower are generated by the 6-digit right shift, the mask digits are 0.111 in order to validate these three digits).

In this case, the higher digits are only 0s and a carry may be generated by lower digits. Therefore, "1" is set to the left of the radix point to obtain 1.000 as the addend higher digits lowest position value (Step S5).

Next, the sticky-bit for addend lower digits generator unit 3 generates a sticky-bit for addend lower digits, in accordance with the addend lower digits. In this case, since the addend lower digits are not all 0s, "1" is generated as the sticky-bit for addend lower digits (Step S6). Furthermore, since the product and addend have the same sign (both +) (i.e., since an output of an exclusive OR (hereinafter Abbreviated EOR) gate EOR1 is "0"), an output of an AND gate AND 1 is "0" which is supplied to the carry propagate adder unit 6. This is because it is not necessary to negate if the product and addend have the same sign. The gate EOR 1 may be formed in the digit alignment shift number and exponent generator unit 1.

With the above operations, the equation (1) is rewritten by the following equation (2).

$$\{(1.110 \times 1.101 + \text{addend middle digits}) \times 2^5\} + \text{sticky-bit for addend lower digits} = \{(1.110 \times 1.101 + 00.000001) \times 2^5\} + \text{sticky-bit for addend lower digits} \quad (2)$$

Next, the multiplier array 4 calculates (1.110×1.101+00.000001) in the above equation (2). First, the product term is transformed into addition terms (3-1) to (3-4) as follows.

| | |
|---|---|
| 0.001110 | (3-1) |
| +0.00000 | (3-2) |
| +0.1110 | (3-3) |
| +1.110 | (3-4) |
| +00.000001 | (3-5) |

The term (3-5) stands for the addition part of the equation (2).

The multiplier array 4 is, for example, an array of carry save adders. The carry save adder adds three values and outputs two values (two terms) in the carry and sum format. The carry part is generated by setting "1" to the next digit position if each digit position has two or more is. The sum part is generated by setting "1" to the same digit position if each digit position has one or three 1s.

Therefore, addition of the first terms (3-1) to (3-3) yields two terms corresponding to the carry part (3-6) and sum part (3-7) as follows.

| | |
|---|---|
| 0.010000 | (3-6) |
| +0.110110 | (3-7) |
| +0.1110 | (3-4) |
| +00.000001 | (3-5) |

The above first three terms (3-6), (3-7) and (3-4) are added to yield two terms (3-8) and (3-9) as follows.

| | |
|---|---|
| 01.100000 | (3-8) |
| +1.010110 | (3-9) |
| +00.000001 | (3-5) |

These three terms (3-8), (3-9), and (3-5) are added to yield two terms (3-10) and (3-11) as follows.

| | |
|---|---|
| 010.000000 | (3-10) |
| +00.110111 | (3-11) |

These two terms are outputs of the multiplier array 4, the value (3-10) corresponds to the carry part, and the value (3-11) corresponds to the sum part (Step S7).

The detailed operation of the leading digit detector unit 5 when the digit alignment shift number is equal to or larger than "−2" will be described later with reference to the accompanying drawings including FIGS. 5 to 7.

The leading digit detector unit 5 generates an exponent normalizing value, a mask for generating a sticky-bit, and a normalizing shift number, in accordance with the outputs (terms (3-10) and (3-11)) from the multiplier array 4 and the digit alignment shift number from the digit alignment shift number and exponent generator unit 1. First, at the first step shown in FIG. 7 to be described later, the highest digit "0" of the addend higher digits is added to the higher digit side of an output of the multiplier array 4, i.e., to the higher digit side of the sum part of the multiplier array, and the result is outputted together with the carry part to the leading non-zero digit detector unit 5. Next, it is judged whether the product and addend have the same sign or not. As described earlier, since the product and addend have the same sign (an output "0" of the EOR gate EOR1), the flow advances to the third step, where the digits other than "00", are searched downward from the digits "00" at the first digit position of the outputs (terms (3-10) and (3-11)) of the multiplier array 4. The digits "10" are found at the second digit position so that this digit position is the leading digit.

Since the leading digit is at the second digit position left of the radix point, "1" is outputted as the exponent normalizing value to the exponent normalizing unit 8 (Step S8). If the leading digit position is at the first, second, third, and etc. left of the radix point, then the exponent normalizing values are 0, 1, 2, . . . etc. On the other hand, if the leading digit position is at the first, second, third, and etc. right of the radix point, then the exponent normalizing values are −1, −2, −3, . . . etc.

As the mask, 00.000111 is obtained (Step S9) by setting "1" to the digit positions equal to and lower than the (n+1)-th digit position (fourth digit position right of the radix point) from the highest digit position (second digit position left of the radix point) (Step S9).

Since the leading digit is at the second digit position left of the radix point, "1" is outputted as the normalizing shift number to the normalizing shifter 10 (Step S10). If the digit alignment shift number is equal to or larger than "−2", the normalizing shift value is the same as the exponent normalizing value.

Figure 7:
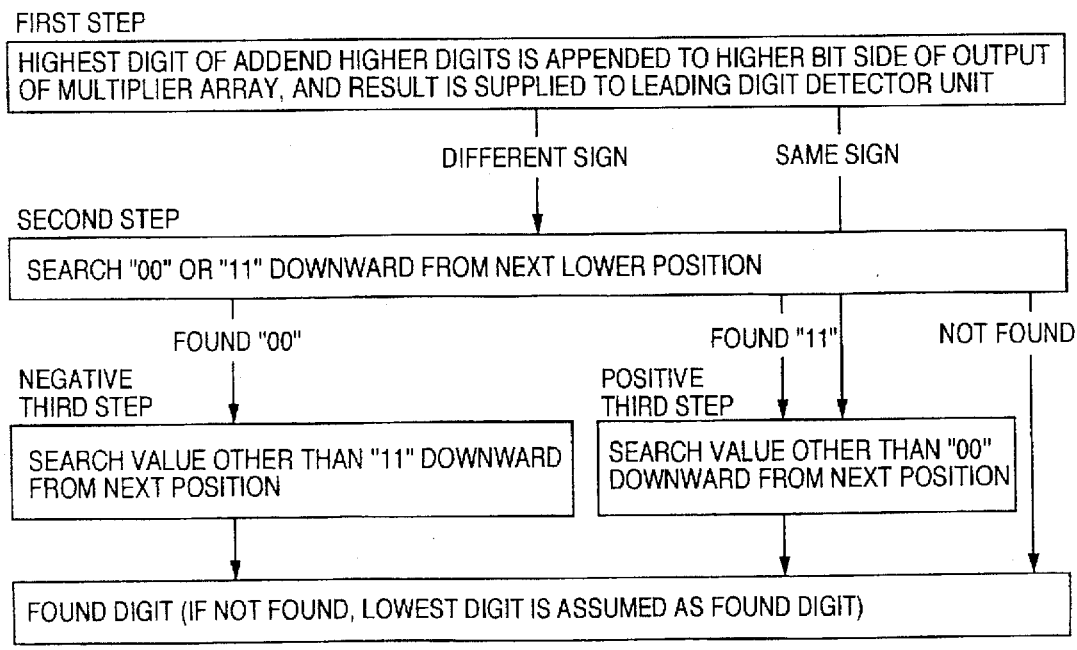
FIG. 7 is a flow chart illustrating the processes shown in FIG. 6 and modified so as to apply them to the leading digit detector unit of the multiply-add unit shown in FIG. 1.

If it is judged at the first step in FIG. 7 that the product and addend have the same sign, "0" is outputted as a negate (sign change) signal to an EOR gate EOR 2 and to the positive number conversion and rounder unit 11. On the other hand, if it is judged at the first step in FIG. 7 that the product and addend have different signs, the flow advances to the second step in FIG. 7. If the digits "00" are found at the lower digit position, the addition result is negative so that "1" is outputted as the negate signal, whereas if the digits "11" are found at the lower digit position, the addition result is positive so that "0" is outputted as the negate signal (Step S22). In this example, since the product and addend have the same sign, "0" is outputted as the negate signal.

The positive number conversion and rounder unit 11 negates an output of the normalizing shifter 10 if the negate signal is "1".

The carry propagate adder 6 adds the carry part (3-10) and sum part (3-11) outputted from the multiplier array 4 and an output "0" of the AND gate AND 1 to obtain 10.110111 (Step S11) which is outputted to the sticky-bit generator unit 9 and normalizing shifter 10. The carry "0" from the highest digit of the added value 10.11011 obtained at Step S11 is outputted to the addend higher digit incrementer 7 (Step S12).

The addend higher digit incrementer 7 receives the addend higher digits 0.000, addend higher digits lowest position value 1.000, and carry, and selects either a sum 01.000 of the addend higher digits 0.000 and addend higher digits lowest position value 1.000 or the addend higher digits 0.000, depending upon the carry. The selected value is shifted in accordance with an output of the EOR gate EOR 1 shown in FIG. 2 and outputted. In this example, since the carry is "0", the addend higher digits 00.000 are selected, and since the product and addend have the same sign (since the output of the EOR gate EOR 1 shown in FIG. 2 is "0"), the addend higher digits 00.000 are outputted without shifting them (Step S13).

At this time, the equation (1) is rewritten as the following equation (4) by using the added value obtained at Step S11 and the exponent "5" obtained at Step S1.

$$(10.110111 \times 2^5) + \text{sticky-bit for addend lower digits} \qquad (4)$$

The exponent normalizing unit 8 adds the exponent "5" supplied from the digit alignment shift number and exponent generator unit 1, and the exponent normalizing value "1" supplied from the leading digit detector unit 5, and outputs the added value "6".

The sticky-bit generator unit 9 masks the output 10.1101 from the carry propagate adder 6 with the mask bits 00.000111 outputted from the leading digit detector unit 5 to obtain a logical sum of these outputs (Step S15), and outputs a logical sum "1" of the first mentioned logical sum and "1" supplied from the sticky-bit for addend lower digits generator unit (Step S16).

Since the normalizing shift number obtained at Step S10 and supplied from the leading digit detector unit 5 is "1", the normalizing shifter 10 right-shifts by one digit the output 10.110111 of the carry propagate adder 6 to extract the higher six bits of 01.0110 (Step S17). A logical sum of the higher six bits 01.0110 and the output 00.000 of the addend higher digit incrementer 7 is calculated to obtain a value 01.0110 and output it (Step S18).

At this time, the equation (1) is rewritten as:

$$(01.0110 \times 2^6) + \text{sticky-bit} \qquad (5)$$

The positive number conversion and rounder unit 11 operates differently depending upon the rounding mode. It is assumed in this example that the value is rounded to a nearest number or an even number. Since the output of the normalizing shifter 10 is 01.0110 and the sticky-bit from the sticky-bit generator unit 9 is "1", an output of the positive number conversion and rounder unit 11 is 1.011 (Step S19).

Since the leading digit position is not necessary to be corrected at the positive number conversion and rounder unit 11, the exponent correction unit 12 outputs the output "6" itself of the exponent normalizing unit 8 (Step S20).

The calculation result is therefore $1.011 \times 2^6$ (Step S21).

Next, calculating the following equation (6) will be described with reference to FIGS. 1 and 3. FIG. 3 illustrates the process flow at each constituent element shown in FIG. 1 when the equation (6) is calculated by the multiply-add unit shown in FIG. 1.

$$(-1.110 \times 2^{-1}) \times (1.101 \times 2^{-2}) + (1.011 \times 2^1) \qquad (6)$$

First, the digit alignment shift number and exponent generator unit 1 generates a digit alignment shift number $-1+(-2)-1=-4$ in accordance with the exponents of the equation (6) (Step S30). In this case, since the digit alignment shift number "−4" is not equal to "−3" but is smaller than "−3", the addend exponent "1" is selected and outputted instead of selecting a sum $(-1+(-2)=-3)$ of the exponents of the product terms (Step S31 in FIG. 3).

Next, the addend digit alignment and sign adjusting unit 2 left-shifts (toward the higher digit side) the mantissa 1.011 of the addend by 4 digits to obtain 10110.000000, in accordance with the digit alignment shift number "−4" obtained at Step S30. First, addend middle digits 10.000000 are obtained from the digits 10110.000000 (eight digits are considered as effective numbers since the multiply operation is 4 digits×4 digits) (Step S32). In this example, the product and addend of the equation (6) have different signs, and the output of the EOR gate EOR 1 is "1". Therefore, the addend middle digits 10.000000 obtained at Step 32 are inverted to obtain 01.111111 which is outputted to the multiplier array 4 (Step S33).

Addend higher digits 0.100 are obtained and outputted to the addend higher digits incrementer 7 (Step S34), the addend higher digits being obtained as a logical product of 0.100 of the inverted mantissa 1.011 of the addend and a mask 1.110 (since the highest three digits of the mantissa 1.011 flowing higher are generated by the 4-digit left shift, the mask digits are 1.110 in order to validate these highest three digits). Furthermore, addend lower digits 0.000 are obtained and outputted to the addend lower digits for sticky-bit generator 3 (Step S35), the addend lower digits being obtained as a logical product of the mantissa 1.011 of the addend and a mask 0.000 (since no digit of the mantissa 1.011 flowing lower is generated by the 4-digit left shift, the mask digits are all 0s).

Since the highest three digits of the addend higher digits are valid, the third highest digit corresponds to the lowest digit of the addend higher digits. Therefore, "1" is set to the third highest digit to obtain 0.010 as the addend higher digits lowest position value, and the result is outputted to the addend higher digit incrementer 7 (Step S36).

Although the two's complement of the addend higher digits is 10.100, the highest digit is omitted because it indicates the sign and is not necessary for the calculation.

Next, the sticky-bit for addend lower digits generator unit 3 generates a sticky-bit for addend lower digits, in accordance with the addend lower digits. In this case, since the addend lower digits are all 0s, "0" is generated as the sticky-bit for addend lower digits and outputted to the sticky-bit generator unit 9 (Step S37). Furthermore, since the product and addend have different signs (+ and −) (i.e., since an output of the EOR gate EOR1 is "1") and the output of the AND gate AND 1 is "1" (because the sticky-bit is inverted and inputted to AND 1), this value "1" is outputted to the carry propagate adder unit 6 (Step S38). This is because it is necessary to negate if the product and addend have different signs.

With the above operations, the equation (6) is rewritten by the following equation (7).

$$-(0.100 \times 2^1) + \{(1.110 \times 1.101 + 01.111111) \times 2^3\} \qquad (7)$$

Next, the multiplier array 4 calculates $(1.110 \times 1.101 + 01.111111)$ in the above equation (7). First, the product term is transformed into addition terms whose three terms are sequentially added similar to the example shown in FIG. 2, to obtain the following carry part (8-1) and sum part (8-2).

011.101100           (8-1)

+01.001001 (8-2)

These two terms (8-1) and (8-2) are outputs of the multiplier array 4.

The leading digit detector unit 5 generates an exponent normalizing value, a mask for generating a sticky-bit, and a normalizing shift number, in accordance with the outputs (terms (8-1) and (8-2)) from the multiplier array 4 and the digit alignment shift number supplied from the digit alignment shift number and exponent generator unit 1. As described earlier, since the digit alignment shift number is not equal to "−3" but is smaller than "3", and the multiplicand/multiplier product and the addend have different signs, the highest digit is one digit lower than the highest digit of the addend higher digits. Since the product and addend have different signs, "−1" is outputted as the exponent normalizing value to the exponent normalizing unit 8 (Step S40). As the mask, 00.011111 is obtained (Step S40) by setting "1" to the digit positions equal to and lower than the (n+1)-th (=4+1=5th) digit position (second digit position right of the radix point) from the leading digit position (fourth digit position left of the radix point). The normalizing shift number is "3" which is obtained by adding "1" to the digit alignment shift number "−4" and inverting the sign. This value "3" is outputted to the normalizing shifter 10 (Step S41).

If the digit alignment shift number is equal to or smaller than "−3", "0" is outputted as the negate signal if the product and addend have the same sign, or "1" is outputted as the negate signal if they have different signs. In this example, they have different signs and so "1" is outputted (Step S48).

The carry propagate adder 6 adds the carry part (8-1) and sum part (8-2) outputted from the multiplier array 4 and an output "1" of the AND gate AND 1 to obtain 100.110110 (Step S42) which is outputted to the sticky-bit generator unit 9 and normalizing shifter 10. The carry "1" from the highest digit of the added value 100.110110 obtained at Step S42 is outputted to the addend higher digit incrementer 7 (Step S43).

The addend higher digit incrementer 7 receives the addend higher digits 0.100, addend higher digits lowest position value 0.010, and carry, and selects either a sum 00.110 of the addend higher digits and addend higher digits lowest position value or the addend higher digits 0.100, depending upon the carry. The selected value is shifted in accordance with an output of the EOR gate EOR 1 shown in FIG. 2 and outputted. In this example, since the carry is "1", the sum 00.110 is selected, and since the product and addend have different signs (since the output of the EOR gate EOR 1 shown in FIG. 2 is "1"), the sum is left-shifted by one digit (i.e., digit-aligned) to obtain a value 01.100 which is outputted to the normalizing shifter 10 (Step S44).

The exponent normalizing unit 8 adds the exponent "1" supplied from the digit alignment shift number and exponent generator unit 1 and the exponent normalizing value "−1" supplied from the leading digit detector unit 5, and outputs the added value "0" (Step S45).

At this time, the equation (6) is rewritten as the equation (8).

$$-((01.10 \times 2^0) + (00.110110 \times 2^{-3})) \quad (8)$$

The sticky-bit generator unit 9 masks the output 00.110110 from the carry propagate adder 6 with the mask digits 00.011111 outputted from the leading digit detector unit 5 to obtain a logical sum of these outputs, and outputs a logical sum "1" of the first mentioned logical sum and "0" from the sticky-bit for addend lower digits (Step S46).

Since the normalizing shift number is "3", the normalizing shifter 10 right-shifts by three digits the output 00.110101 of the carry propagate adder 6 to extract the higher six digits of 00.0001. A logical sum of the higher six digits 00.0001 and the output 01.100 of the addend higher digit incrementer 7 is calculated to obtain a value 01.1001 and output it (Step S47).

At this time, the equation (6) is rewritten as:

$$-((01.1001 \times 2^0) + \text{sticky-bit} \quad (9)$$

Since the addend higher digits are negative, in response to the negate signal "1" from the leading digit detector unit 5, the positive number conversion and rounder unit 11 inverts 0s and 1s of the output 01.1001 of the normalizing shifter 10 to obtain a value 10.0110 for the positive value (Step S49). It is not necessary to add "1" for the positive value because the sticky-bit is not "0". For further normalization, the leading digit position is corrected to obtain a value 1.00110 (Step S50). Assuming that the value is rounded to a nearest number or an even number, the output of the positive number conversion and rounder unit 11 becomes 1.010 because the sticky-bit is "1" (Step S51).

Since correction by one digit is performed by the positive number conversion and rounder unit 11, the exponent correction unit 12 adds "1" to the output "0" of the exponent normalizing unit 8 and outputs "1" (Step S52).

The calculation result is therefore $1.010 \times 2^1$ (Step S53).

As described above, in this example, if the addend is larger than the product, the addend higher digits flowing higher than the product are processed without shifting the highest digit. The final normalized multiply-add calculation result is obtained by adding the normalized multiply-add calculation result of the product and the addend digits other than those flowing higher than the product. Accordingly, the addend higher digits flowing higher than the product are not necessary to be normalized and the multiply-add calculation can be performed at high speed.

Figure 4:
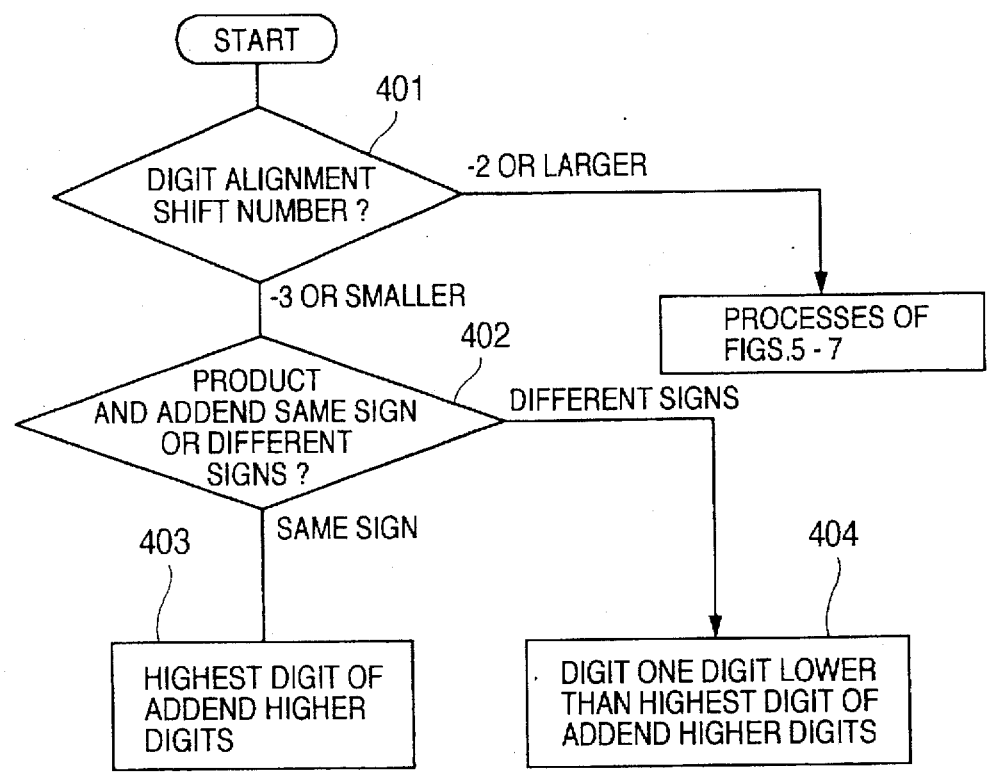
FIG. 4 is a flow chart illustrating an example of a method of detecting the leading non-zero digit, to be performed by the leading digit detector unit shown in FIG. 1, the leading non-zero digit being detected from the absolute values of the mantissas of the two terms of the multiply-add calculation result before normalization outputted from the multiplier array.

A method of detecting the leading non-zero digit, to be performed by the leading digit detector unit 5, will be described with reference to the flow chart shown in FIG. 4, the leading non-zero digit being detected from the absolute values of the mantissas of the two terms of the multiply-add calculation result before normalization outputted from the multiplier array 4.

First, it is checked at Step 401 whether the digit alignment shift number is "−3" or smaller, or "−2" or larger. If "−2" or larger, the processes illustrated in FIGS. 5 to 7 (in this embodiment, the processes illustrated in FIG. 7) are performed. If the digit alignment shift number is "−3" or smaller, it is checked at Step 402 whether the multiplicand/multiplier product and the addend have the same sign or different signs. If they have the same sign, the highest digit of the addend higher digits is judged to be the leading non-zero digit among the absolute values of the mantissas of the multiply-add calculation result before normalization (Step 403). On the other hand, if they have different signs, the digit one digit lower than the highest digit of the addend higher digits is judged to be the leading non-zero digit among the absolute values of the mantissas of the multiply-add calculation result before normalization (Step 404).

Next, a method of detecting the leading non-zero digit without any error, to be performed by the leading digit detector unit 5, will be described for the case wherein the digit alignment shift number is "−2" or larger, the leading non-zero digit being detected from the absolute values of the mantissas of the two terms of the multiply-add calculation result before normalization outputted from the multiplier array 4.

First, a method will be described in which values generally represented by the two's complement notation are supplied to adders of the leading digit detector unit 5, and the leading non-zero digit is detected from the absolute values of the addition results, without any error. Next, a method will be described wherein one digit error is permitted to simplify the method. Lastly, the method applicable to the leading digit detector unit 5 will be described.

Figure 5:
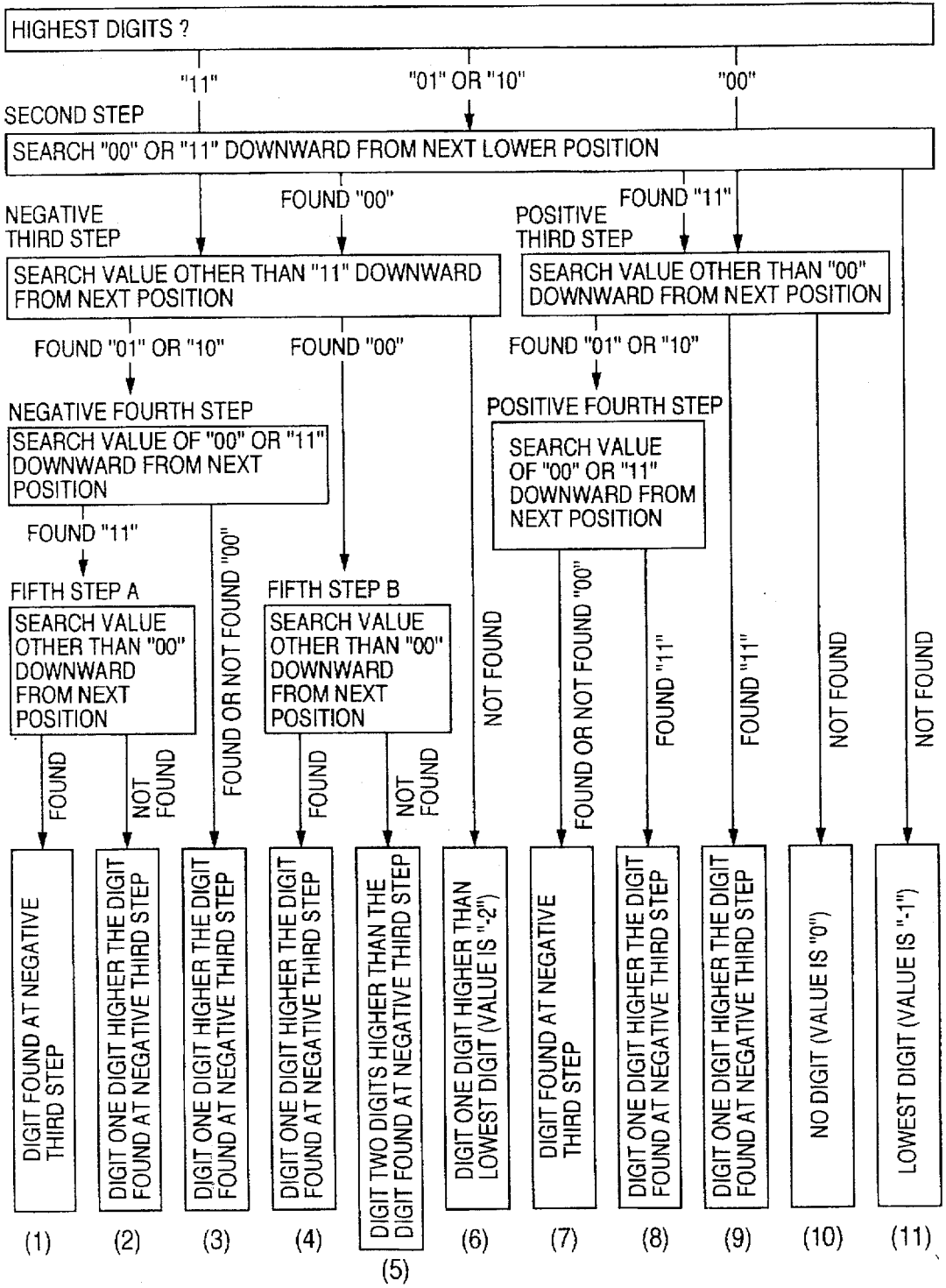
FIG. 5 is a flow chart illustrating the processes of detecting the leading non-zero digit, to be performed by the leading digit detector unit without any error when the digit alignment shift number is "−2" or larger, the leading non-zero digit being detected from the absolute values of the mantissas of the two terms of the multiply-add calculation result before normalization outputted from the multiplier array.

FIG. 5 illustrates the method of detecting the leading non-zero digit from the absolute values of the addition results of inputs to the adder, without any error.

If the addition result is positive, the addition result itself is an absolute value. Therefore, the leading digit with the addition result can be detected. If the addition result is negative, 0s and 1s of the addition result are inverted and "1" is added to obtain the absolute value. In this case, the digit at the first bit "0" as searched from the highest bit is generally the leading digit. However, if 0s and 1s of the addition results having all 1s from the highest digit to a certain digit and all 0s lower than the certain digit are inverted and added with "1", a carry is propagated so that the leading non-zero digit is at the digit that is one digit higher than the first digit "0" as searched from the highest digit. Keeping this in mind, the method will be described in the following.

The first and second steps check whether the addition result is positive or negative. The third step searches the leading digit. The fourth step corrects the leading digit in accordance with the carry. The fifth step corrects the leading digit in accordance with the carry when the negative value is changed to the positive value.

Hereafter, an input two-digit value represents the value of a digit pair at each position of the carry part and sum part, the two terms outputted from the multiplier array 4. At the first step, the input two-digit value at the highest position, is checked. If "00" or "11", the second step is skipped and the third step is performed. If "01" or "10", the second step is performed.

At the second step, the position having the input two-digit value of "00" or "11" is searched downward from the next lower position. If such a position cannot be found, this corresponds to (11) shown in FIG. 5 and the addition results are all 1s, i.e., "−1" so that the leading non-zero digit is the lowest digit.

The third step is classified into two steps according to the results of the first and second steps.

One step is a negative third step which is performed when the input two-digit value at the highest position is "11" at the first step or when the value "00" is detected at the second step, i.e., when the addition result is negative. The other is a positive third step which is performed when the input two-digit value at the highest position is "00" at the first step or when the value "11" is detected at the second step, i.e., when the addition result is positive.

At the negative third step, a position having the input two-digit value other than "11" is searched downward from the next lower position. If such a position cannot be found, this corresponds to (6) in FIG. 5 and the addition result is "−2" so that the leading non-zero digit is one digit higher than the lowest digit. If a position having the value "01" or "10" is found, the leading non-zero digit shifts one digit depending upon the presence of a carry propagated from the lower digits. In this case, therefore, a negative fourth step is performed. If a position having a value "00" is found, a fifth step B is performed.

At the positive third step, a position having the input two-digit value other than "00" is searched downward from the next lower position. If such a position cannot be found, this corresponds to (10) in FIG. 5 and the addition result is "0" so that the leading non-zero digit is not present. If a position having the value "01" or "10" is found, the leading non-zero digit shifts one digit depending upon the presence of a carry propagated from the lower digits. In this case, therefore, a positive fourth step is performed. If a position having a value "11" is found, this corresponds to (9) in FIG. 5. A carry is generated at this position and "1" is set as the digit that is one digit higher than this position. Therefore, the digit that is one digit higher than this position is the leading non-zero digit.

At the negative fourth step, a position having the input two-digit value of "00" or "11" is searched downward from the next lower position. If a position having the value "11" is found, a fifth step A is performed. If the position having the value "00", is found or not found, this corresponds to (3) in FIG. 5 and the carry is not generated. Therefore, the leading non-zero digit is at the position one digit higher than the position found at the negative third step.

At a positive fourth step, a position having the input two-digit value of "00" or "11" is searched downward from the next lower position. If a position having the value "11" is found, this corresponds to (8) in FIG. 5 and a carry propagates from this position to the position one digit higher than the position found at the positive third step. Therefore, the leading non-zero digit is at the position one digit higher than the position found at the positive third step. If the position having the value "00" is found or neither the position having the value "00" or "11" is not found, this corresponds to (7) in FIG. 5 and the carry is not generated. Therefore, the leading non-zero digit is at the position found at the positive third step.

At the fifth step B, a position having the input two-digit value other than "00" is searched downward from the next lower position. If a position having the value other than "00" is found, this corresponds to (1) in FIG. 5 and a carry propagates from the position found at the negative fourth step to a position one digit higher than the position found at the negative third step. Therefore, the leading non-zero digit is at the position found at the negative third step. If a position having the value other than "00" is not found, this corresponds to (2) in FIG. 5 and a carry further propagates if 0s and 1s are inverted and "1" is added. Therefore, the leading non-zero digit is at the position one digit higher than the position found at the negative third step.

At the fifth step B, a position having the input two-digit value other than "100" is searched downward from the next lower digit. If a position having the value other than "00" is found, this corresponds to (4) in FIG. 5. The leading non-zero digit is therefore at the position one digit higher than the position found at the negative third step. If the position having the value other than "00" is not found, this corresponds to (5) in FIG. 5 and a carry propagates if 0s and 1s are inverted and "1" is added. Therefore, the leading non-zero digit is at the position two digits higher than the position found at the negative third step.

The method of detecting the leading non-zero digit of the absolute values of the addition results from inputs to the adder has been described above.

Next, this method will be detailed by using particular 4-bit values.

As shown in FIG. 5, since the method has eleven cases (1) to (11), each case will be described.

Assuming that inputs to the adder are 1011 and 1110, the value at the highest position is "11" at the first step. Therefore, the negative third step is performed. Since a value "01" is found at the second highest position, the negative fourth step is performed. Since a value "11" is found at the next lower position, the fifth step A is performed. Since a value other than "00" is found at the next lower position, this corresponds to (1) and the leading non-zero digit is the second digit. If the two input values are added and the result is negated, the value 0111 is obtained, confirming the correct result.

Assuming that inputs to the adder are 1101 and 1111, the value at the highest position is "11" at the first step. Therefore, the negative third step is performed. Since a value "01" is found at the third highest position, the negative fourth step is performed. Since a value "11" is found at the next lower position, the fifth step A is performed. Since the search is already done to the lowest position, the value other than "00" is not found and this corresponds to (2) and the leading non-zero digit is the second digit. If the two input values are added and the result is negated, the value 0100 is obtained, confirming the correct result.

Assuming that inputs to the adder are 0010 and 1000, the value at the highest position is "01" at the first step. Therefore, the second step is performed. Since the value "00" is found at the next lower position, the negative third step is performed. Since a value "10" is found at the third highest position, the negative fourth step is performed. Since a value "00" is found at the next lower position, this corresponds to (3) and the leading non-zero digit is the second digit. If the two input values are added and the result is negated, the value 0110 is obtained, confirming the correct result.

Assuming that inputs to the adder are 1000 and 0001, the value at the highest position is "10", at the first step. Therefore, the second step is performed. Since the value "00" is found at the next lower position, the negative third step is performed. Since a value "00" is found at the third highest position, the fifth step B is performed. Since a value other than "00", is found at the next lower position, this corresponds to (4) and the leading non-zero digit is the second digit. If the two input values are added and the result is negated, the value 0111 is obtained, confirming the correct result.

Assuming that inputs to the adder are 1100 and 1100, the value at the highest position is "11" at the first step. Therefore, the negative third step is performed. Since a value "00" is found at the third highest position, the fifth step B is performed. Since a value other than "00" is not found, this corresponds to (5) and the leading non-zero digit is the first digit. If the two input values are added and the result is negated, the value 1000 is obtained, confirming the correct result.

Assuming that inputs to the adder are 0101 and 1001, the value at the highest position is "01" at the first step. Therefore, the second step is performed. Since the value "00" is found at the second next lower position, the negative third step is performed. Since a value other than "11" is not found, this corresponds to (6) and the leading non-zero digit is the third digit. If the two input values are added and the result is negated, the value 0011 is obtained, confirming the correct result.

Assuming that inputs to the adder are 0110 and 1101, the value at the highest position is "01" at the first step. Therefore, the second step is performed. Since the value "11" is found at the next lower position, the positive third step is performed. Since a value "10" is found at the third highest position, the positive fourth step is performed. Since the value of "00" or "11" is not found, this corresponds to (7) and the leading non-zero digit is the third digit. If the two input values are added, the value 0011 is obtained, confirming the correct result.

Assuming that inputs to the adder are 0011 and 0101, the value at the highest position is "00" at the first step. Therefore, the positive third step is performed. Since the value "01" is found at the second highest position, this corresponds to (8) and the leading non-zero digit is the first digit. If the two input values are added, the value 1000 is obtained, confirming the correct result.

Assuming that inputs to the adder are 0011 and 0010, the value at the highest position is "00" at the first step. Therefore, the positive third step is performed. Since a value "11" is found at the third highest position, this corresponds to (9) and the leading non-zero digit is the second digit. If the two input values are added, the value 0101 is obtained, confirming the correct result.

Assuming that inputs to the adder are 0110 and 1010, the value at the highest position is "01" at the first step. Therefore, the second step is performed. Since the value "11" is found at the second next position, the positive third step is performed. Since the value other than "0011 is not found, this corresponds to (10) and the value is "0". Therefore, the leading non-zero digit is not present. If the two input values are added, the value 0000 is obtained, confirming the correct result.

Assuming that inputs to the adder are 0110 and 1001, the value at the highest position is "01" at the first step. Therefore, the second step is performed.

Since neither value "00" nor "11" is found this corresponds to (11) and the leading non-zero digit is the lowest digit. If the two input values are added and the result is negated, the value 0001 is obtained, confirming the correct result.

The method of detecting the leading non-zero digit without any error of the absolute values of the addition results from inputs to the adder has been described above.

The method illustrated in FIG. 5 is relatively complicated and has a possibility of increasing the amount of hardware and prolonging a detection time. This method can be simplified considerably if one digit error is permitted in detecting the leading non-zero digit.

Figure 6:
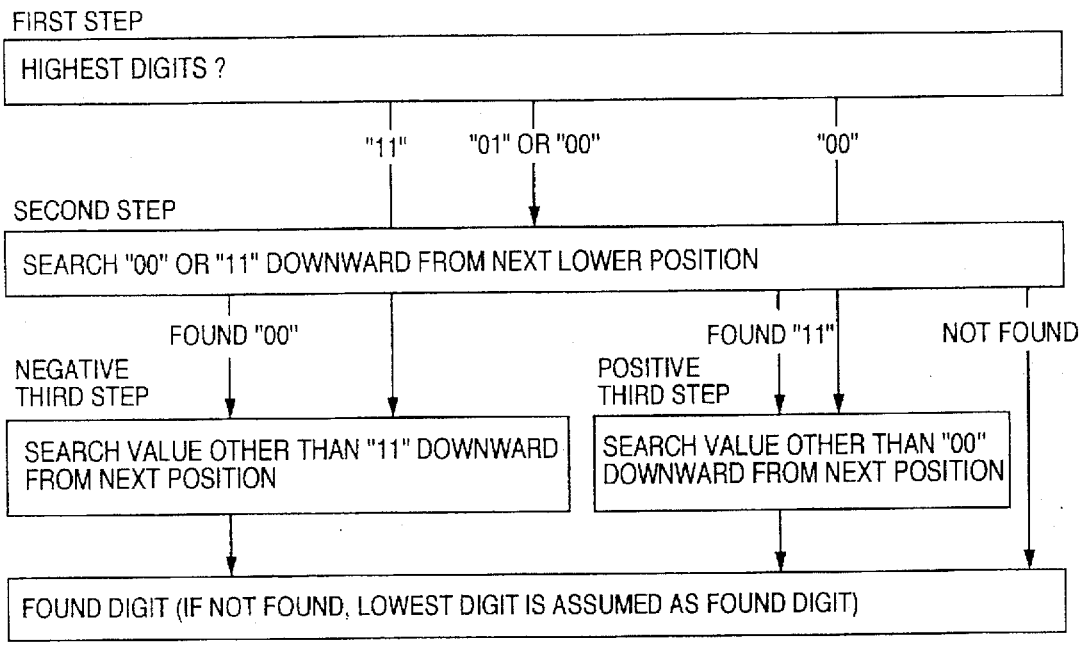
FIG. 6 is a flow chart illustrating the modified processes of FIG. 5, the processes detecting the leading non-zero digit with one digit error, the leading non-zero digit being detected from the absolute values of the mantissas of the multiply-add calculation result before normalization.

FIG. 6 illustrates a method of detecting the leading non-zero digit of the absolute values of the addition results from inputs to the adder with one digit error.

First and second steps are the same as the method illustrated in FIG. 5. At negative and positive third steps, a position having the input two-digit value other than "00" and "11" is searched downward from the next lower position. The found position is used as the leading non-zero position. If not found, the lowest digit is used as the leading non-zero digit.

With the above method, the cases (1) to (11) in FIG. 5 are within one digit error except the case (5) which indicates that the leading non-zero digit is at the digit that is two digits higher than the found position.

However, in the case (5), the positive number conversion and rounder unit 11 operates in the following manner. At the time when the positive number conversion and rounder unit 11 inverts each digit, the leading nonzero digit is one digit higher than the found position, the error is within one digit, and the value is all 1s. When "1" is added, a carry propagates to the highest digit so that the value becomes 100.0. Since the correct mantissa can be obtained by right-shifting this value by two digits, "2" is sent to the exponent correction unit 12 to correct the exponent. Since the mantissa is all 0s excepting the highest digit, these values are correct and a 2-digit right shift circuit is not necessary. Only the highest digit is right-shifted by two digits.

The method illustrated in FIG. 6 becomes applicable to the leading digit detector unit 5 in the following manner.

If the digit alignment shift number is "−1" or larger, the addend higher digits have no digit, and if the digit alignment shift number is "−2", the addend higher digits have one digit. Therefore, the leading digit detection is performed relative to a value obtained by appending this one digit to an output of the multiplier array 4, which is an input to the carry propagate adder 6 (first step in FIG. 7).

The outputs of the multiplier array 4 have two values of 2n+1 digits and 2n digits assuming that the corresponding inputs have n digits. For example, if the multiplier array 4 is a carry save adder array, the carry part is 2n+1 digits and the sum part is 2n digits. One digit constituting the addend higher digits is appended to the 2n digits. Therefore, both the two values have 2n +1 digits. In order to apply the method illustrated in FIG. 5 without modifying it, it is also necessary to append a sign digit to the highest digit of the carry and sum parts. If the product and addend are the same sign, "0" is appended to the highest digit of the carry and sum parts. If the product and addend are different signs, "0" is appended to the highest digit of one of the carry and sum parts and "1" is appended to the highest digit of the other of the carry and sum parts. However, if the positive third and the following steps are performed in the case of the same sign, and the second and the following steps are performed in the case of different signs, the sign digit is not necessary to be added. Accordingly, the first step in FIG. 6 is modified as the first step in FIG. 7.

Figures 8, 9:
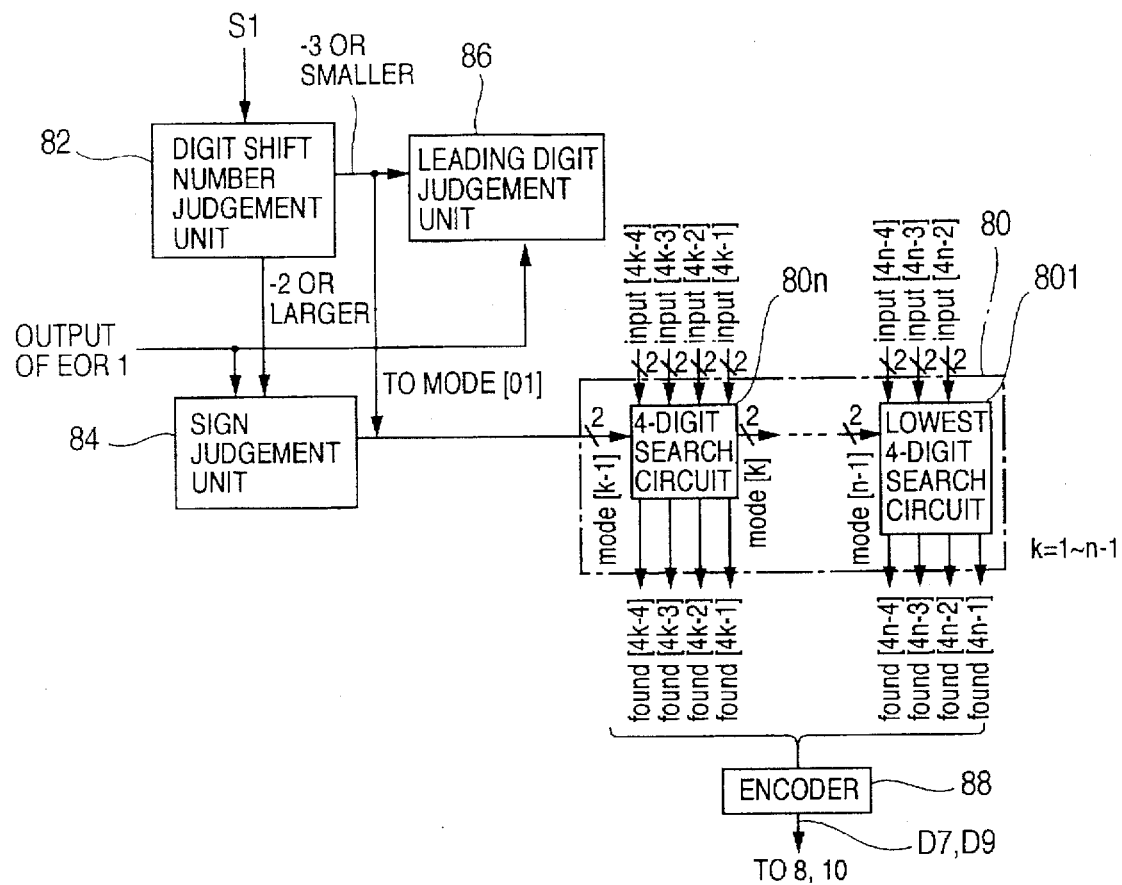
FIG. 8 is a block diagram showing an example of the structure of the leading digit detector unit for realizing the processes shown in FIG. 7.
FIG. 9 is a diagram showing examples of modes used by the search circuit shown in FIG. 8.

FIG. 8 is a block diagram showing an example of the structure of the leading digit detector unit 5 shown in FIG. 5 and performing the processes shown in FIG. 7. The leading digit detector unit 5 includes a digit shift number judgement unit 82, a sign judgement unit 84, a leading digit judgement unit 86, a search circuit 80, and an encoder 88. In FIG. 8, the structure of a unit for generating a mask for a sticky-bit is omitted.

The digit shift number judgement unit 82 judges whether an input digit shift number S1 is "−2" or larger, or "−3" or smaller. If it is judged that the digit shift number is "−3" or smaller, the leading digit judgement unit 86 performs Steps 402 to 404 shown in FIG. 4 in accordance with an output of the gate EOR 1, and outputs a search complete mode (01) to be described later, to the search circuit 80 so as not to perform the search process.

If the digit shift number is judged to be "−2" or larger, the sign judgement unit 84 performs the first step shown in FIG. 7. Specifically, in accordance with an output of the gate EOR 1, it is judged whether the product and addend have the same sign or different signs, and a mode (mode[k−1]) corresponding to the judgement result is outputted to the search circuit 80.

The search circuit 80 performs the second, positive third, and negative third steps shown in FIG. 7. Assuming that each digit width of the two terms outputted from the multiplier array 4 is 4n digits (n is an integer of 1 or larger), the search circuit 80 is constituted by (n−1) 4-digit search circuits 802 to 80n and one lowest 4-digit search circuit 801. In FIG. 8, each input (input[]) to each 4-digit search circuit is a pair of two digits each at a corresponding position of two terms outputted from the multiplier array 4 (i.e., one digit of the carry part and one digit of the sum part). Each 4-digit search circuit judges whether each pair of two digits is the pair of designated digits at the corresponding step in FIG. 7. The judged result is outputted as (found[]), and a search mode signal (mode[]) is generated in accordance with the judgment results of all the inputs to the 4-digit search circuit, and outputted to the next stage 4-digit search circuit.

The output signal (found[]) takes "1" if the value at the input digit is the pair of designated digits at the corresponding step in FIG. 7, and "0" if not.

All outputs (found[4n−1] to found[4k−4]) of the search circuit 80 are encoded by the encoder and outputted as an exponent normalizing value D7 and as a normalizing shift number D9.

As above, in this example, the search circuit 80 is divided every four digits to form a plurality of 4-digit search circuits. Each 4-digit search circuit searches by using a two-term input (input[]) from the multiplier array 4 and a search mode (mode[]) from the pre-stage circuit (or higher 4-digit search circuit), and outputs a search result (found[]) and supplies a search mode corresponding to the search result to the lower 4-digit search circuit.

In this example, there are four types of search modes shown in FIG. 9. The modes include a positive negative judgement mode corresponding to the second step in FIG. 7, a positive value search mode corresponding to the positive third step, a negative value search mode corresponding to the negative third step, and a search complete mode. These four types of modes are assigned 2-digit codes "00", "10", "11", and "01", respectively, for the discrimination between the mode types.

FIGS. 10A and 10B are tables showing examples of logic of the 4-digit search circuits and lowest 4-digit search circuit shown in FIG. 8. In FIGS. 10A and 10B, "00" bar and "11" bar indicate pairs of two bits other than "00" and "11" respectively.

The operation of the search circuit 80 shown in FIG. 8 will be described with reference to the flow chart of FIG. 7 and the logic shown in FIGS. 10A and 10B.

The sign judgement unit 84 executes the first step of FIG. 7. If an output of the gate EOR 1 is "1", it means different signs so that the positive/negative judgement mode [00] is outputted as the mode signal (mode[k−1]). If an output of the gate EOR 1 is "0", it means the same sign so that the positive value search mode [10] is outputted as the mode signal (mode[k−1]).

The operation of each 4-digit search circuit 802–80n will be described. In each 4-digit search circuit 802–80n, if the input mode signal (mode[k−1] is the positiv/negative judgement mode [00] (corresponding to (1) to (22) in FIG. 10A), the second step is executed to search the position having a pair of two digits of "00" or "11" downward from the next lower position. If there is a position having a value "00" among four pairs of inputs (input[4k−4] to input[4k−1]) to the 4-digit search circuit (corresponding to (1) to (10) in FIG. 10A), the addition result is negative. Therefore, the negative third step is executed to search a position having a value other than "11" downward from the found position having the value "00". If the position having a value other than "11" is found, the leading digit is at the found position having the value other than "11". In this case, search at the succeeding 4-digit search circuits is not necessary, and the search complete mode [01] is outputted as the mode signal (mode[k]) ((1) to (3), (5), (6), (8) of FIG. 10A). If the position having the value other than "11" cannot be found, the negative value search mode [11] is outputted as the mode signal (mode[k]) to perform the negative third step at the next stage 4-digit search circuit ((4), (7), (9), (10) in FIG. 10A).

If a position having a value "11" is found at the second step (corresponding to (13) to (22) in FIG. 10A), the addition result is positive. Therefore, the positive third step is executed to search a position having a value other than "00" downward from the found position having the value "11". If the position having a value other than "00" is found, the leading digit is at the found position having the value other than "00". In this case, search at the succeeding 4-digit search circuits is not necessary, and the search complete mode [01] is outputted as the mode signal (mode[k]) ((15), (17), (18), (20)–(22) in FIG. 10A). If the position having the value other than "00" cannot be found, the positive value search mode [10] is outputted as the mode signal (mode[k]) to perform the positive third step at the next stage 4-digit search circuit ((13), (14), (16), (19) in FIG. 10A).

If a position having a value of "00" and "11" cannot be found at the second step, the positive/negative judgement mode [00] is outputted as the mode signal (mode[k]) to execute the second step at the next stage 4-digit search circuit ((11), (12) in FIG. 10A).

In each 4-digit search circuit 802–80n, if the input mode signal (mode[k–1]) is the positive value search mode [10] ((24) to (28) in FIG. 10A), the positive third step is executed similar to the above.

In each 4-digit search circuit 802–80n, if the input mode signal (mode[k–1]) is the negative value search mode [11] ((29) to (33) in FIG. 10A), the negative third step is executed similar to the above.

In each 4-digit search circuit 802–80n, if the input mode signal (mode[k–1]) is the search complete mode [01] ((23) in FIG. 10A), search is not performed but the search complete mode [01] is outputted.

The logic of the lowest 4-digit search circuit 801 is almost the same as that of the 4-digit search circuits 802 to 80n. However, if a corresponding digit is not found at the second, positive third, or negative third step, the lowest digit is judged to be the leading digit. The lowest 4-digit search circuit 801 does not output the mode signal.

Next, the operation of the search circuit 80 shown in FIG. 8 will be described by using the example shown in FIG. 2. In the example shown in FIG. 2, the search circuit 80 is constituted by one 4-digit search circuit 802 and the lowest 4-digit search circuit. The lowest 4-digit search circuit 801 is extended to 5 digits. Since the output of the gate EOR 1 is "0" and the product and addend have the same sign, the positive value search mode [10] as the mode signal (mode [k–1]) is supplied to the 4-digit search circuit 802 which executes the positive third step. Specifically, as a position having a value other than "00" is searched downward, there is a value "10" at the (input[4k–3]) so that "0100" is outputted as the outputs (found[4k–4], found[4k–3], found [4k–2], and found[4k–1]) and the search complete mode [01] is outputted as the mode signal (mode[k]).

In the above manner, the leading digit is judged to be the digit corresponding to the input (input[4k–3]).

The circuit shown in FIG. 8 is a good circuit if the digit width of an output of the multiplier array 4 is small. However, if the digit width is large, the search time becomes long. Furthermore, if the digit width is large and normalization by the normalizing shifter 10 is performed by one step shift, the load on the shifter becomes heavy and the shift time is slowed.

A search circuit 110 shown in FIG. 11A is an improved circuit of the search circuit 80 shown in FIG. 8, dealing with a wide digit width.

In this example, the digit width is 64 digits. The search circuit 110 is constituted by seven mode look-ahead and first-stage shift control circuits 30 to 36, a lowest first-stage shift control circuit 37, fifteen 4-digit search circuits 38 to 52, a lowest 4-digit search circuit 53, and eight 8-bit ORs 54 to 61 (FIG. 11B).

The mode look-ahead circuit is added in order to transfer the search mode downward and speed up search, and a first stage shift control signal (shift_1st [1–8]) and a second stage shift control signal (shift_2nd [1–8]) are outputted in correspondence with two-step normalization of the normalizing shifter 10.

Eight pairs of digits are inputted to each mode look-ahead and first stage shift control circuit 30–36 and the lowest first stage shift control circuit 37. Of the eight pairs, the higher four pairs and lower four pairs are inputted to two 4-digit search circuits (having the same structure as FIG. 8).

The first shift control signal (shift_1st[1][8]) outputted from each mode look-ahead and first stage shift control circuit 30–37 is supplied to an encoder 90. A corresponding one of the eight outputs (found[8k–1] to found[8k–1] where k=1 to 8) of the two 4-digit search circuits related to each first stage shift control circuit 30–37 is inputted to a corresponding one of OR gates 54 to 61. Specifically, eight outputs (found[8k–8], found[8(k+1)–8], . . . , found[56]) are inputted to the OR gate 54 and eight outputs (found[8k–7], found[8(k+1)–7], . . . , found[57]) are inputted to the OR gate (second stage shift control circuit) 55. Second shift control signals (shift_2nd[i]) outputted from these OR gates 54 to 61 are supplied to the encoder 90.

Each mode look-ahead and first stage shift control circuit 30–36 searches in accordance with the mode signal (mode[ ]) supplied from the preceding stage, to judge whether the highest digit can be searched from the inputs at the eight digits. If the leading digit can be searched, the first shift control signal (shift_1st[k]) of "1" is outputted to the encoder, and if not, the signal of "0" is outputted to the encoder. In addition, a mode signal corresponding to the judgement result is supplied to the succeeding stage.

FIGS. 12A and 12B are tables showing examples of operation logic of the mode look-ahead and first shift control circuit and the lowest first stage shift control circuit shown in FIG. 11A.

Next, the operation logic of each mode look-ahead and first stage shift control circuit 30–36 will be described. In FIG. 12A, a symbol "-" means "don,t care".

In FIG. 12A, examples (1) to (18) indicate the input mode (input[00]), i.e., the positive/negative judgement mode, to execute the second step at the corresponding circuit. Of the examples (1) to (18), the examples (1) to (8) correspond to the case where the corresponding circuit executes the second step relative to the 8-pair inputs and finds a value "11", and therefore the negative value search mode [11] is outputted as the mode signal. Therefore, the succeeding stage executes the negative third step. Similarly, the examples (11) to (18) correspond to the case where the corresponding circuit executes the second step relative to the 8-pair inputs and finds a value "00", and therefore the positive value search mode [10] is outputted as the mode signal. Therefore, the succeeding stage executes the positive third step. The examples (9) to (10) correspond to the case where the corresponding circuit executes the second step relative to the 8-pair inputs and finds neither the value "00" nor "11", and therefore the positive/negative judgement mode [00] is outputted as the mode signal. Therefore, also the succeeding stage executes the second step.

The example (19) corresponds to the case where the preceding stage finds the leading digit and outputs the input mode [01], i.e., the search complete mode, and therefore also the corresponding circuit outputs the search complete mode [01].

The example (20) corresponds to the input mode [10], i.e., the positive value search mode wherein the corresponding circuit executes the positive third step and the digit other than "00" cannot be found, and therefore the positive value search mode [10] is outputted. Therefore, also the succeeding stage executes the positive third step.

The example (21) corresponds to the input mode [11], i.e., the negative value search mode wherein the corresponding circuit executes the negative third step and the digit other than "11" cannot be found, and therefore the negative value search mode [11] is outputted. Therefore, also the succeeding stage executes the negative third step.

In both the examples, the first stage shift control signal (shift__1st[j]) is "0".

The example (22) is different from the above examples and corresponds to the case where the mode look-ahead and first stage shift control circuit finds the leading digit, the search complete mode [01] is outputted, and the first stage shift control signal (shift__1st[j]) of "1" is outputted.

The operation logic of the lowest first stage shift control circuit 37 is shown in FIG. 12B. Specifically, the leading digit is found by the preceding stages so that the input mode [01], i.e., the search complete mode, is performed and the first stage shift control signal (shift__1st[8]) of "0" is outputted. Since the leading digit cannot be found at the preceding stages if the input mode other than the input mode [01], namely, the input mode [00], [10], or [11] is performed, the leading non-zero digit is assumed to be found at the lowest 8-digits even if it is not found. In this case, since it is assumed that the leading digit is found, the first stage shift control signal (shift__1st[8]) of "1" is outputted.

Therefore, the leading digit position (shift amount) in the unit of eight digits can be determined from the first stage shift control signal (shift__1st[k]) supplied from each mode fast transfer and shift control circuit, and the leading digit position (shift amount) in the unit of one digit can be determined from the second stage shift control signal (shift__2nd[i]) supplied from the OR gates 54 to 61. Accordingly, the final leading digit position can be identified from the first and second stage shift control signals, and this position is encoded to obtain the exponent normalizing value and normalizing shift number.

As described above, if each mode look-ahead and first stage shift control circuit executes the step in FIG. 7 and the target digit cannot be found, the succeeding mode look-ahead and first stage shift circuit is required to execute the same step ((10), (19) to (21) in FIG. 12A). Therefore, if the succeeding stage is required to execute the step in the same mode as the present stage, the mode is required to be transferred quickly. In such a case, with the structure shown in FIG. 8, although the mode can be transferred through the search operation by the 4-digit search circuit, with the structure shown in FIG. 11A, the mode can be transferred to the succeeding stage quickly only through the operation by the mode look-ahead and first stage shift control circuit. Therefore, as compared to the structure shown in FIG. 8, the mode can be transferred to the lower stage at high speed so that the leading digit can be detected quickly.

The mode look-ahead logic seems complicated at one way and a high speed transfer of the mode signal is considered to be impossible. However, the transition of the search mode occurs in two cases including a transition from the positive/negative judgement mode to the positive or negative value search mode and a transition from the search mode to the search complete mode. In other words, of the eight mode look-ahead circuits of eight digits, at least six mode look-ahead circuits have no transition.

Therefore, if the nontransiting search mode is transferred quickly, the mode signal can be transferred quickly. There are three cases where the search mode does not transit, including the case where inputs are all 0s (example (20) in FIG. 12A), the case where inputs are all 1s (example (21)), and the case where exclusive logical sum of inputs is all 1s (examples (9) and (10)). The corresponding circuit portion can be speeded up easily.

Since the first stage shift control logic judges whether the leading digit is at any one of eight digits, a simple and high speed logic can be generated as compared to the search result (found[0–63]).

Since the second shift control logic (found[0–63]) is generated via the 8-input OR gates, the speed is lowered. However, this logic is sufficient if it generates the result until the first stage shift is completed. Therefore, there is no practical problem.

For example, in the multiply-add calculation of double precision floating point, an input mantissa has "53" digits, and an output of the carry propagate adder 6 is "106" digits plus a carry to the higher digits. If a digit cancelation occurs, there is a possibility that the leading non-zero digit is at any one of the "106" digits. However, a possibility that the leading non-zero digit is at any one of the lower "53" digits is very small. If a massive cancelation occurs, the digits of effective numbers are "0" digits. Furthermore, if the leading non-zero digit is at any one of the lower "153" digits, rounding is not necessary and a correct value can be outputted without normalization. As a result, in such a case, although the number of execution cycles increases, the value not normalized is once outputted and thereafter normalized by increasing the number of execution cycles.

The performance of the multiply-add unit is not affected therefore even if the leading digit detector unit 5 and normalizing shifter 10 are operated such that normalization is performed if the leading non-zero digit is at the digit of the 52-nd digit or higher of an output of the carry propagate adder 6, and if not, the lower "53" digits not normalized are outputted. In this manner, the leading digit detector unit 5 and normalizing shifter 10 can be simplified.

Figure 13:
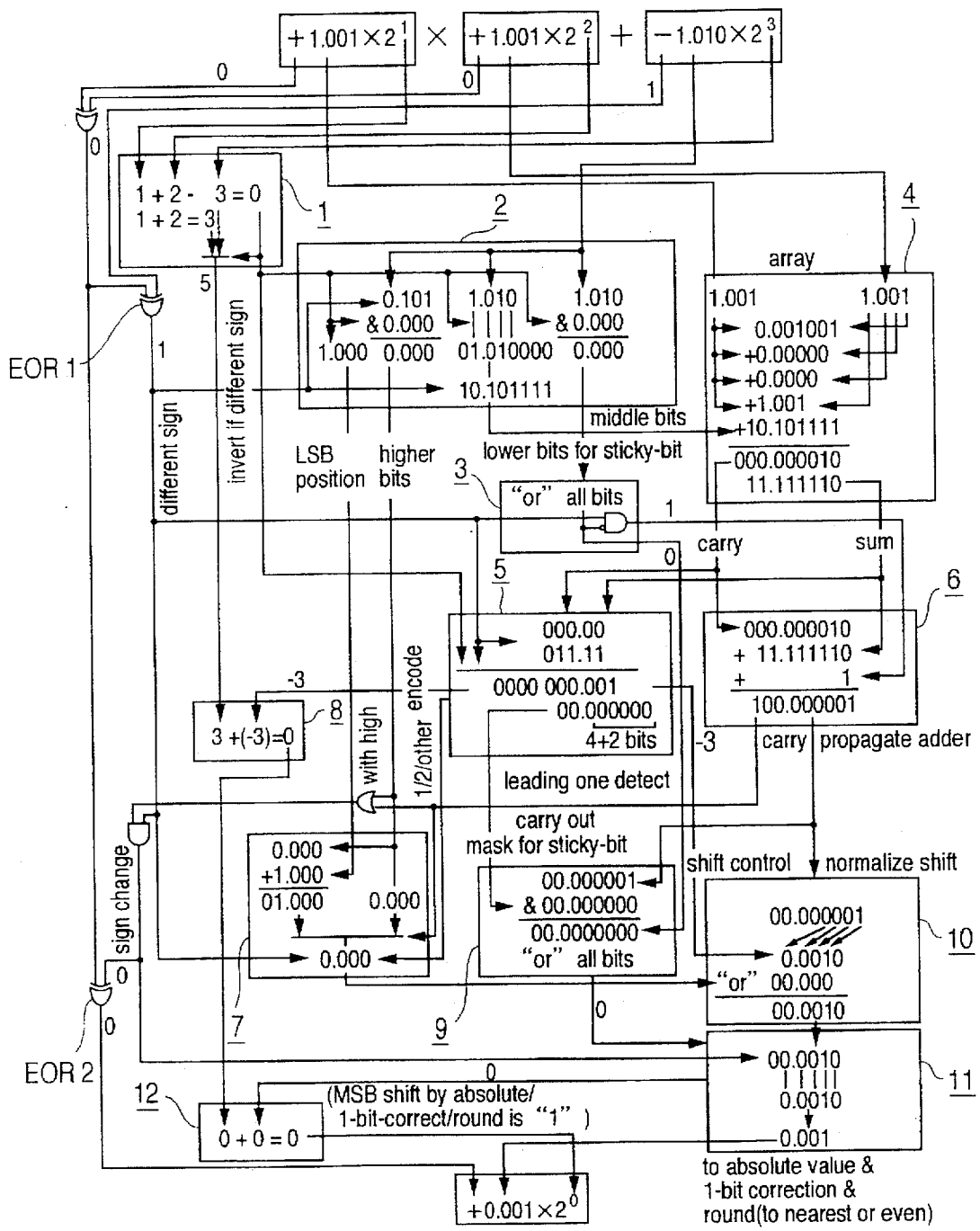
FIG. 13 is a diagram illustrating the process flow at each constituent element for performing a multiply-add calculation by the multiply-add unit according to another embodiment of the invention.

The operation of the multiply-add unit having such a structure will be described with reference to FIG. 13.

In the following, particular mantissas of 4-digit are used to calculate an equation:

$$(1.001 \times 2^1) \times (1.001 \times 2^2) + (-1.010 \times 2^3)$$

First, the digit alignment shift number and exponent generator unit 1 generates a digit alignment shift number of 1+2−3=0 which is not equal to "−2" but larger than "−2", and therefore an exponent 1+2=3 is generated.

Next, the addend digit alignment and sign addition unit 2 right-shifts the addend mantissa 1.010 by "0" digit. Since the product and addend have different signs, 0s and is are inverted to generate the addend middle digits 10.101111, addend higher digits 1.000, addend lower digits 0000, and addend higher digit lowest position value 1.000. Next, the sticky-bit for addend lower digits unit 3 generates the sticky-bit "0" because the addend lower digits are 0000.

With the above operations, the above equation is rewritten by:

$$(1.000 \times 2^5) + ((1.001 \times 1.001 + 10.101111) \times 2^3).$$

$2^5$ indicates that "1" at the highest digit of the addend higher digits is at a position one digit higher than the highest digit of the addend middle digits.

Next, the multiplier array 4 sequentially adds the three terms as described earlier by transforming each product term into addition terms. Therefore, the term (1.001×1.001+10.101111) is rewritten by:

000.000010

+11.111110

These two terms are the outputs from the multiplier array 4.

The leading digit detector unit 5 terminates its search at the fourth lowest digit from the outputs of the multiplier array 4 and the digit alignment shift number "0" because the lowest digit is the actual leading digit, outputs an exponent normalizing number "−3" to the exponent normalizing unit 8, outputs a mask 00000000 to the sticky-bit generator unit 9, and outputs a normalizing shift number "−3" to the normalizing shifter 10.

The carry propagate adder 6 adds the outputs of the multiplier array 4, and because the product and addend have different signs and the sticky-bit for addend lower digits is "0", adds "1" to the lowest digit to thereby generate 00.000001 which is outputted to the sticky-bit generator 9 and normalizing shifter 10. A carry "1" at the highest digit is outputted to the addend higher digit incrementer 7.

The addend higher digit incrementer 7 generates 00.000 because the digit alignment shift number "0" is not "−2" but larger than "−2" and the normalizing shift number "−3" is neither "1" nor "2".

At this time, the initial equation is rewritten by:

$$(00.000 \times 2^3) + (00.000001 \times 2^3)$$

The exponent normalizing unit 8 adds the exponent "3" from the digit alignment shift number and exponent generator unit 1, and "−3" from the highest digit detector unit 6, and outputs the result "0".

The sticky-bit generator unit 9 masks the output 00.000001 of the carry propagate adder 6 with the mask 00000000 outputted from the leading digit detector unit 5 to obtain its logical sum, and outputs a logical sum "0" between the first mentioned logical sum and the bit "0" from the sticky-bit for addend lower digits generator unit 3.

The normalizing shifter 10 left-shifts the output 00.000001 of the carry propagate adder 6 by three digits because the normalizing shift number is "−3", and extracts 00.0010 whose logical sum 00.0010 with the output 00.000 of the addend higher bit incrementer 7 is outputted.

At this time, the initial equation is rewritten by:

$$00.0010 \times 2^0.$$

The positive number conversion and rounder unit 11 outputs 0.001 because the output of the normalizing shifter 10 is 00.0010 and the sticky-bit is "0". The exponent correction unit 12 outputs the output "0" of the exponent normalizing unit 8 without changing it because the positive number conversion and rounder unit 11 is not required to correct the leading digit position.

The final calculation result is therefore $0.001 \times 2^0$, which is normalized to $1.000 \times 2^{-3}$.

Figure 14:
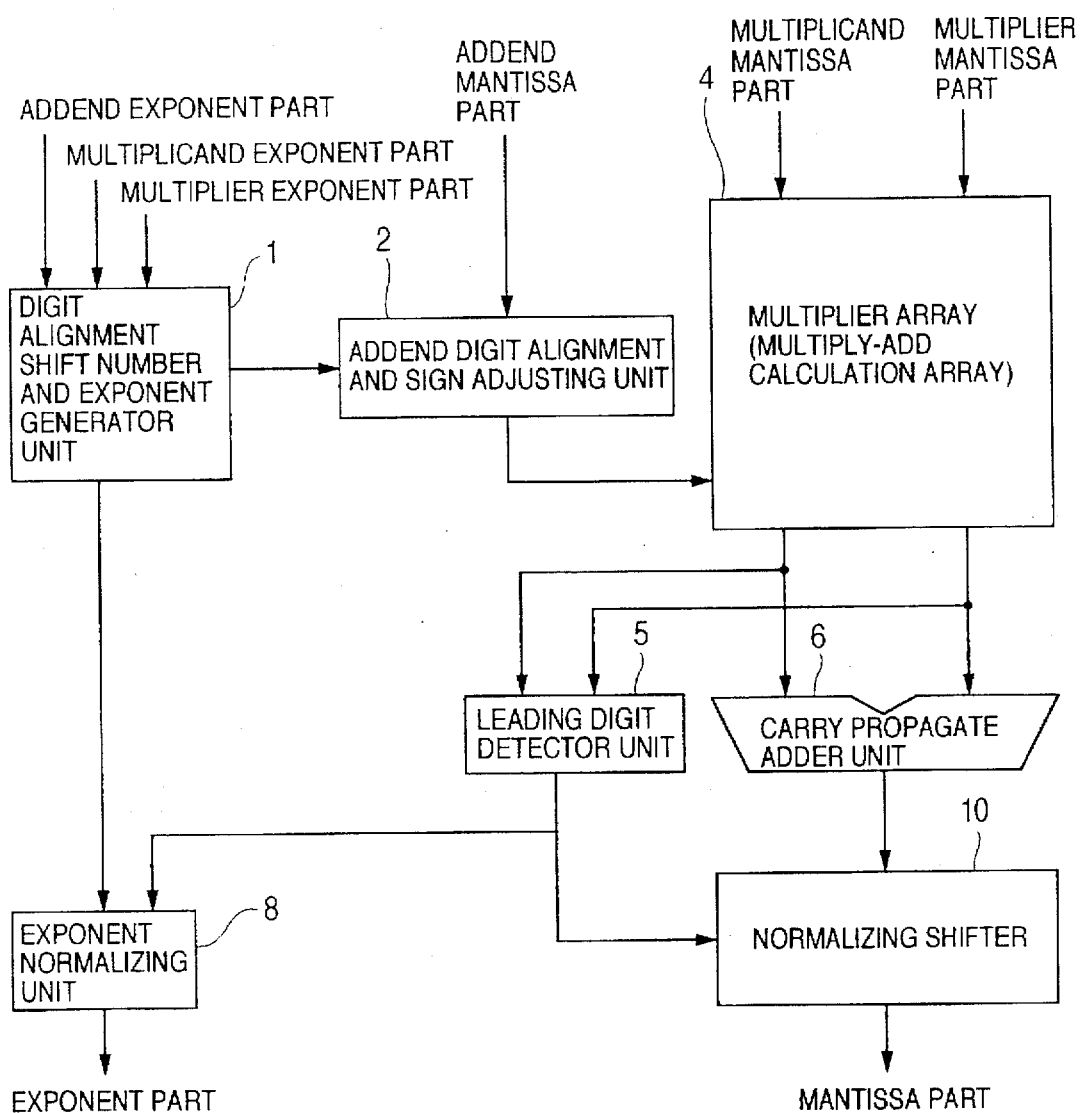
FIG. 14 is a block diagram showing the structure of the multiply-add unit according to still another embodiment of the invention.

FIG. 14 shows the structure of the multiply-add unit according to another embodiment of the invention. The multiply-add unit of this embodiment does not perform digit alignment, positive number conversion, or rounding in various rounding modes, which are generally performed by floating point multiply-add calculations. Therefore, the multiply-add unit of this embodiment is a floating point multiply-add unit using a multiplicand, a multiplier, and an addend which have the same sign, and performing only round-to-zero. Engineers in this field can easily realize a general floating point multiply-add unit by adding the sign adjustment, positive number conversion, and rounding processes to this embodiment.

The embodiment multiply-add unit includes a digit alignment shift number and exponent generator unit 1, an addend digit alignment unit 2, a multiply-add calculation array 4, a leading digit detector unit 5, a carry propagate adder 6, an exponent normalizing unit 8, and a normalizing shifter 10.

The digit alignment shift number and exponent generator unit 1 receives mantissas of an addend, a multiplicand, and a multiplier, and generates a digit alignment shift number and an exponent before normalization which are supplied to the addend digit alignment unit 2 and exponent normalizing unit 8. The exponent before normalization is a sum of the exponents of the multiplicand and multiplier, i.e., the exponent of the product. The digit alignment shift number is generated by subtracting the addend exponent from the product exponent.

If the mantissas with the digit alignment shift number of (−the number of digits of a mantissa −1) or smaller are intended to be processed integrally, the bit widths of the mantissa processing units such as the addend digit alignment unit 2, multiply-add calculation array 4, highest digit detector unit 5, carry propagate adder 6, and normalizing shifter 10, become very large and are not suitable for practical use. If the rounding is round-to-zero, the product part is rounded to zero and the result is the addend itself. Therefore, a circuit for detecting this and outputting the addend is used additionally in this embodiment. With this circuit, the number of digits of the mantissa processing units can be set to (the number of digits of a mantissa×3).

The addend digit alignment unit 2 receives the addend mantissa and the digit alignment shift number, aligns the digits of the addend mantissa, and outputs them to the multiply-add calculation array 4. Generally, the shift operation is performed in accordance with the digit alignment shift number. However, as described above, if the digit alignment shift number is (−the number of digits of a mantissa −1) or smaller, the process result of the addend digit alignment unit 2 is not used and an arbitrary value can be output. On the other hand, if the digit alignment shift number is (the number of digits of a mantissa×2−1) or larger, the addend is rounded down and the result is the product of the multiplicand and the multiplier. In this case, "0" is outputted as the digit aligned addend mantissa.

The multiply-add calculation array 4 receives the multiplicand mantissa, multiplier mantissa, and digit aligned addend mantissa, and calculates a sum of a product of the multiplicand mantissa and multiplier mantissa and the digit aligned addend mantissa, by using an array such as a carry save adder array and a redundant binary adder array. The results are outputted to the leading digit detector unit 5 and carry propagate adder 6. The output of the multiply-add calculation array 4 has two values which are added by the carry propagate adder 6 to obtain the multiply-add calculation result.

The leading digit detector unit 5 detects the leading non-zero digit of the absolute values of the multiply-add calculation results from outputs of the multiply-add calculation array 4. In accordance with the detected result, an exponent normalizing value is outputted to the exponent normalizing unit 8 and a normalizing shift number is outputted to the normalizing shifter 10. In this embodiment, the exponent normalizing value and normalizing shift number are always the same. Detecting the leading non-zero digit is performed by the method illustrated in FIG. 5. In this embodiment, however, the output of the multiply-add calculation array 4 is not two's complement but an absolute value. In order to use the method illustrated in FIG. 5, "0" is appended to the highest bits of the inputted two values to change them to two's complements. The exponent normalizing value and normalizing shift number correspond to a difference between the leading non-zero digit position and the digit position left of the radix point before normalization.

The carry propagate adder 6 adds the two values outputted from the multiply-add calculation array 4 to generate the mantissa of the multiply-add calculation result before normalization and output it to the normalizing shifter 10.

The exponent normalizing unit 8 adds the exponent normalizing value supplied from the leading digit detector unit 5 to the exponent before normalization, and outputs the normalized addition result as the final exponent of the multiply-add calculation result.

The normalizing shifter 10 normalizes the mantissa of the multiply-add calculation result before normalization supplied from the carry propagate adder 6 by using the normalizing shift number supplied from the leading digit detector unit 5, and outputs it as the final mantissa of the multiply-add calculation result.

Figure 15:
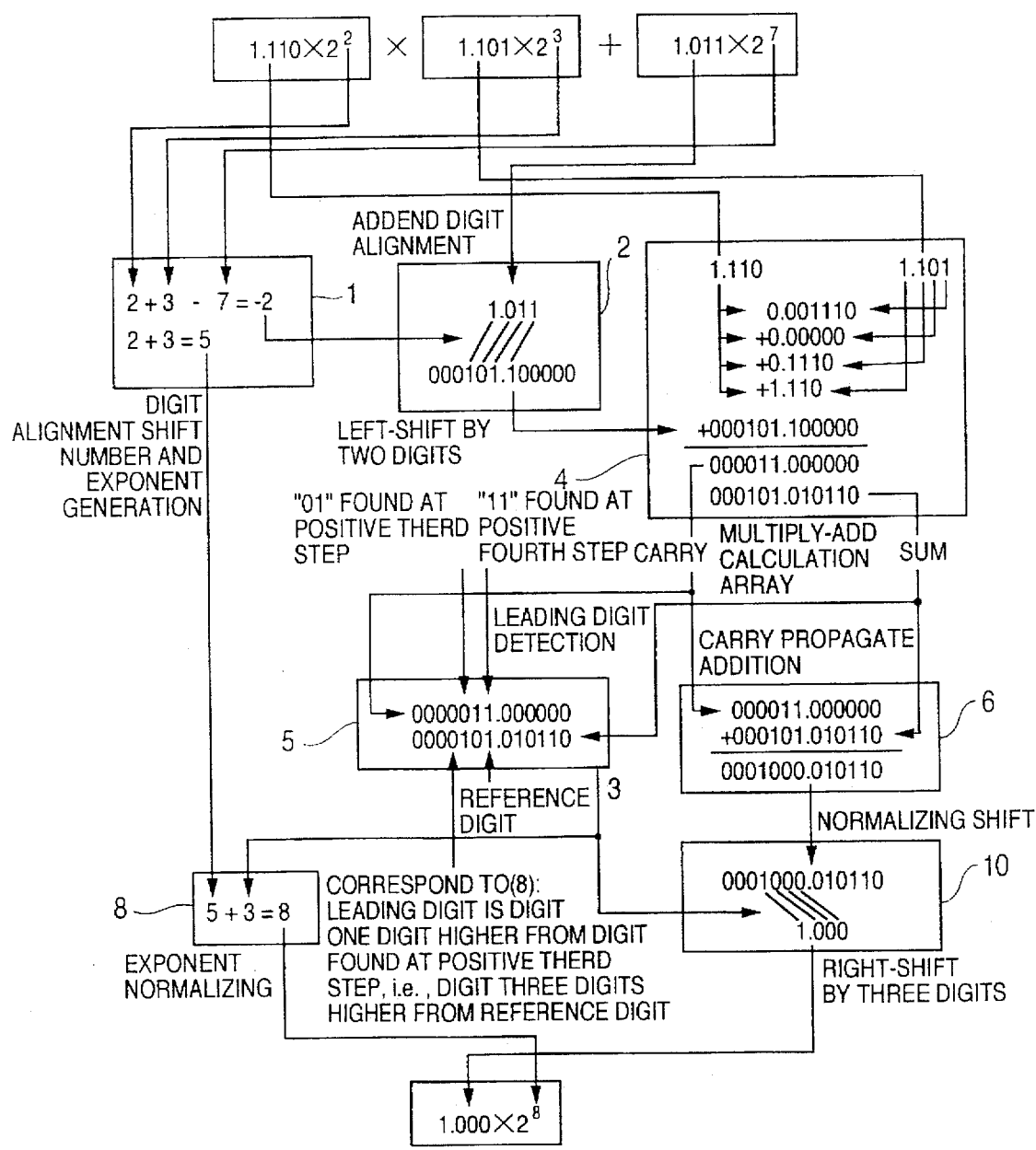
FIG. 15 is a diagram illustrating the process flow at each constituent element shown in FIG. 14 wherein an equation of multiply-add is calculated by the multiply-add unit shown in FIG. 14.

FIG. 15 illustrates an operation of the multiply-add unit of this embodiment wherein 4-digit mantissas are used.

A calculation of the equation $(1.110 \times 2^2) \times (1.101 \times 2^3) + (1.011 \times 2^7)$ will be described. First, the digit alignment shift number and exponent generator unit 1 generates a digit alignment shift number of 2+3−7=−2 and an exponent before normalization 2+3=5. Next, the addend digit alignment unit 2 left-shifts the addend mantissa 1.011 by two digits to generate a digit aligned addend mantissa 000101.100000. With the above operations, the above equation is rewritten by:

$$((1.110 \times 1.101 + 000101.100000) \times 2^5)$$

Next, the multiply-add calculation array 4 transforms each product term of 1.110×1.101+000101.100000 into addition terms as:

```
        0.001110
    +   0.00000
    +   0.1110
    +   1.110
    +000101.100000
```

The above terms are calculated as in the following. The multiply-add calculation array 4 is assumed to be a carry save adder array. The carry save adder adds three numbers and outputs two numbers including a carry part and a sum part. The carry part is generated by setting "1" to the next digit position if each digit position has two 1s or more. The sum part is generated by setting "1" to the same digit position if the digit position has one or three 1s. First, the first three terms are added to generate two terms of the carry part and sum part, yielding:

```
        0.010000
    +   0.110110
    +   1.110
    +000101.100000
```

The new three terms are added to generate two terms, yielding:

```
        01.100000
    +   1.010110
    +000101.100000
```

The three terms are added to generate:

```
    000011.010110
```

+000101.100000

These two terms are the outputs from the multiply-add alculation array 4. The leading digit detector unit 5 etects the leading non-zero digit by the method illustrated in FIG. 5 after the two terms outputted from the multiply-add calculation array 4 are changed to two's complements by appending "0" to the highest digit of the two terms. First, since digits at the highest digit position are "00" at the first step, the positive third step is performed. At this positive third step, "01" is found left by two digits from the reference digit position which is the left digit position of the radix point before normalization. Therefore, the positive fourth step is performed. Since the positive fourth step finds "11", this corresponds to (8) in FIG. 5. Therefore, the leading non-zero digit is at one digit higher from the digit position found at the positive third step, i.e., three digits left from the reference digit. Therefore, "3" is outputted to the exponent normalizing unit 8 and normalizing shifter 10 as the exponent normalizing value and normalizing shift number. The carry propagate adder 6 adds the outputs of the multiply-add calculation array 4 to generate 0001000.010110 which is outputted to the normalizing shifter 10. At this time, the initial equation is rewritten by:

$$(00010000.010110 \times 2^5)$$

Next, the exponent normalizing unit 8 adds the exponent "5" before normalization to the exponent normalizing value "3", supplied from the leading digit detector unit 5, and outputs a value "8". The normalizing shifter 10 right-shifts the output 0001000.010110 of the carry propagate adder 6 by three digits because the normalizing shift number is "3", and outputs 1.000, four digits from the left digit of the radix point. The final calculation result is therefore $1.000 \times 2^8$.

In the above embodiments, an array of carry save adders is used as the multiplier array, and the leading digit detector unit detects the leading non-zero digit from the absolute values by using the two terms of the carry and sum parts calculated and outputted from the multiplier array. It is obviously possible that an array of such as a redundant binary adder array is used and the leading digit detector unit is constructed similar to the above embodiments for detecting the leading non-zero digit of the absolute values by using the two terms of the positive and negative parts calculated and outputted from the multiplier array.

Figure 3:
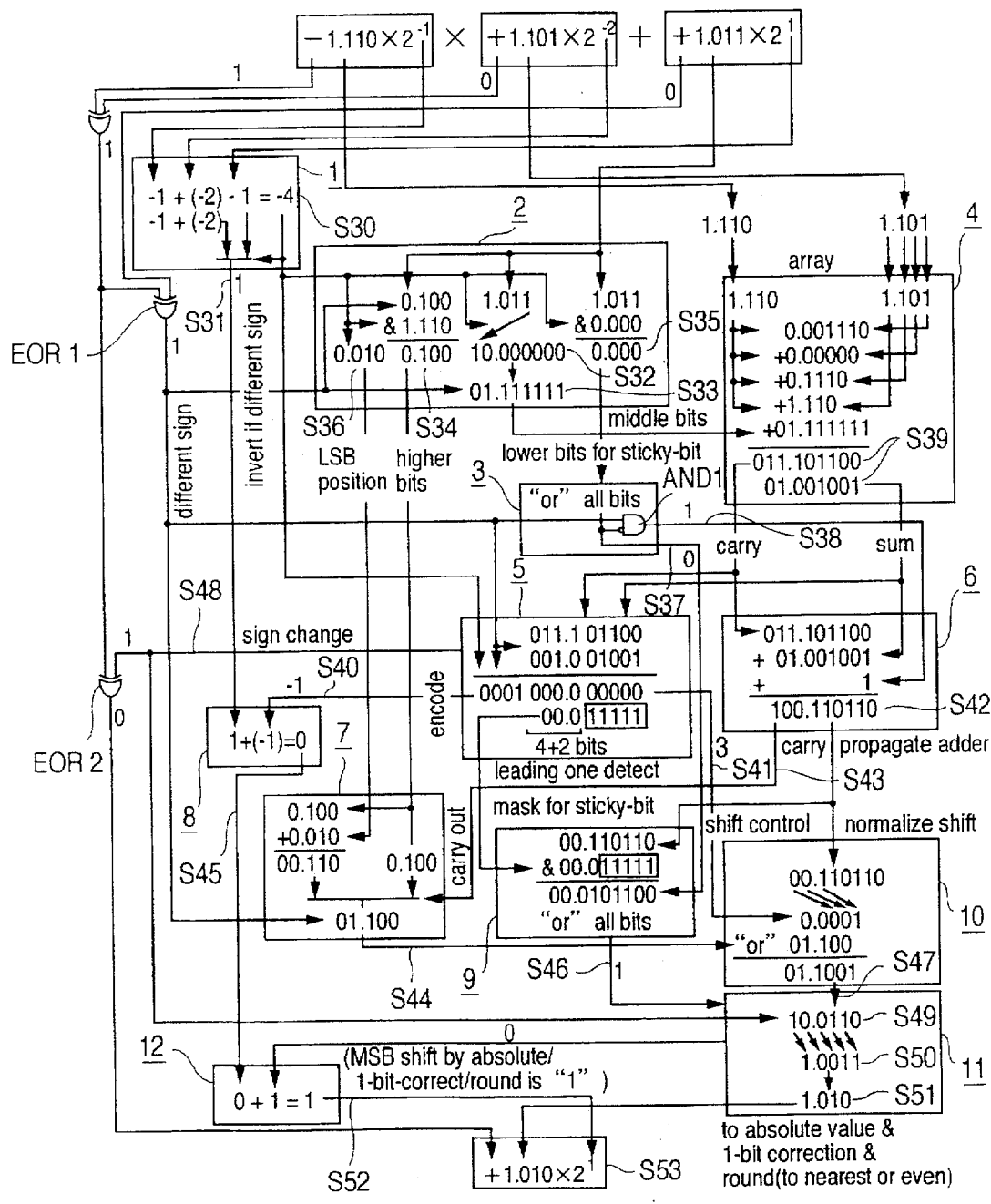
FIG. 3 is a diagram illustrating the process flow at each constituent element shown in FIG. 1 wherein another equation of multiply-add is calculated by the multiply-add unit shown in FIG. 1.

If the addend is larger than the product as in the case shown in FIG. 3, the addend higher digits flowing higher than the product are processed without shifting the highest digit, the multiply-add calculation is performed between the addend digits other than the overflowed digits and the product, and thereafter the normalized result is added to the overflowed digits to obtain the final normalized multiply-add result. In such an embodiment, instead of inputting two terms of the multiplier array to the leading digit detector unit, the mantissa of the multiply-add calculation result before normalization supplied from the carry propagate adder 6 may be used.

Figure 16:
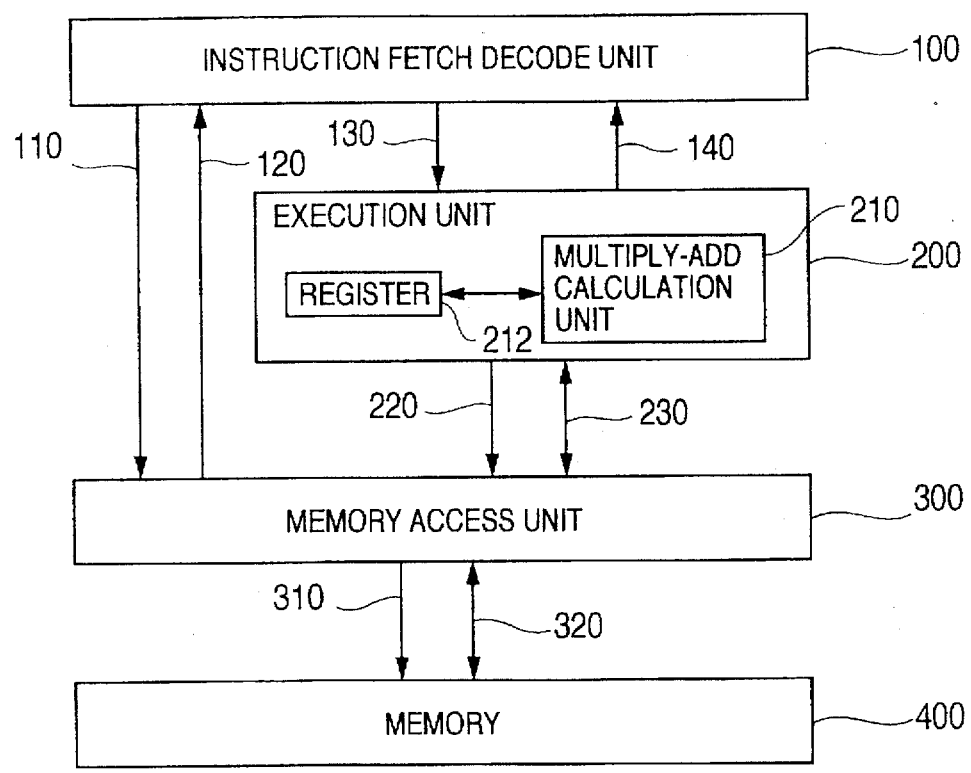
FIG. 16 is a block diagram showing an example of a data processing apparatus using the multiply-add unit of this invention.

Next, an example of the data processing apparatus using the multiply-add unit of this invention will be described with reference to FIG. 16.

This data processing apparatus includes an instruction fetch decode unit 100, an execution unit 200, a memory access unit 300, and a memory 400. A multiply-add unit 210 of this invention is provided in the execution unit 200.

The structure and operation of each part of the apparatus shown in FIG. 16 will be described.

The instruction fetch decode unit 100 outputs an instruction address 110 to the memory access unit 300 for the instruction fetch request, receives an instruction 120 read from the memory 400 via the memory access unit 300, decodes the instruction 120, and outputs control information 130 to the calculation unit 200. Normally, the instruction fetch and decode processes are performed relative to consecutive instruction addresses, and if the execution unit 200 issues a branch request by outputting a branch address 140, the instruction fetch and decode processes are performed relative to the branch address 140.

The execution unit 200 performs execution, data fetch, store, and other operations in accordance with the control information 130 supplied from the instruction fetch decode unit 100. If the execution is floating point multiply-add calculation, the multiply-add unit 210 of this invention is used. In performing the data fetch or store, an address 220 is outputted to the memory access unit 300 and data 230 is outputted in the case of store, to issue the fetch or store request. In the case of fetch, data 230 is received from the memory access unit 300.

In accordance with an instruction fetch request from the instruction fetch decode unit 100 or the data fetch or store request from the calculation unit 200, the memory access unit 300 outputs an address 310 to the memory 400 and outputs data 320 in the case of store. In the case of the fetch request, data 320 fetched from the memory 400 is outputted to the request side.

The memory 400 receives the address 310 from the memory access unit 300 and data 320 in the case of store to perform the fetch or store operation. In the case of the fetch request, data 320 is outputted to the memory access unit 300.

Next, execution by the multiply-add unit 210 will be described. First, the instruction fetch decode unit 100 outputs the instruction address 110 to the memory access unit 300, receives the instruction 120 from the memory access unit 300, and decodes the instruction 120 to generate the control information 130. The control information 130 is information regarding the execution such as operand, addition, multiplication, and floating point calculation. In accordance with the control information, the multiply-add unit 210 performs a multiply-add calculation of data (addend, multiplicand, multiplier) read from the memory 400 or data read from a register 212 in the execution unit 200, in the manner described with respect to the above embodiments. The execution result is stored in the memory 400 via memory access unit 300 or the register 212.

This embodiment is a so-called microprocessor if the units other than the memory 400 are implemented on a single chip, and is a processor board if the units are mounted on a plurality of chips.

This embodiment is an example of the data processing apparatus using the multiply-add unit of this invention. The multiply-add unit of this invention is applicable to other data processing apparatuses using a floating point multiply-add unit.

What is claimed is:

1. A multiply-add unit for performing a multiply-add calculation of a multiplicand, a multiplier, and an addend, comprising:

a digit alignment shift number generator unit for obtaining a digit alignment shift number and an exponent of a multiply-add calculation result before normalization, in accordance with an exponent of the multiplicand, an exponent of the multiplier, and an exponent of the addend;

an addend digit alignment unit for shifting and outputting a mantissa of the addend in accordance with the digit alignment shift number;

a multiply-add calculation array for receiving a mantissa of the multiplicand and a mantissa of the multiplier, and a mantissa of the addend supplied from the addend digit alignment unit, performing a multiply-add calculation of these mantissas, and outputting two terms;

a leading digit detector unit for receiving the two terms supplied from the multiply-add calculation array, and in accordance with the two terms, detecting the leading non-zero digit among absolute values of the mantissas of the multiply-add calculation result before normalization. said leading digit detector unit having a determining portion for determining whether a sum of said two terms is positive or negative, a first detection portion for detecting which digit is the leading non-zero digit among the absolute values of the mantissas of the multiply-add calculation result before normalization based on said two terms when it is determined that said sum is positive, and a second detection portion for detecting which digit is the leading non-zero-digit among the absolute values of the mantissas of the multiply-add calculation result before normalization based on said two terms when it is determined that said sum is negative, whereby the leading non-zero digit is finally determined upon the initial detection of a leading non-zero digit by the leading digit detector unit, whether the initial detection is made by the first detection portion or by the second detection portion;

a carry propagate adder unit for receiving the two terms from the multiply-add calculation array; in accordance with the two terms, performing a carry propagate addition operation in parallel with a leading digit detection operation of the leading digit detector unit; and outputting a mantissa of the multiply-add calculation result before noralization;

a normalizing unit for normalizing the mantissa of the multiply-add calculation result before normalization supplied from the carry propagate adder unit in accordance with the leading digit detected by the leading digit detector unit, and obtaining a normalized mantissa of the multiply-add calculation result; and an exponent normalizing unit for normalizing the exponent of the multiply-add calculation result before normalization supplied from the digit alignment shift number generator unit in accordance with the leading digit detected by the leading digit detector unit, and obtaining a normalized exponent of the multiply-add calculation result.

2. A multiply-add unit according to claim 1, wherein:
the multiply-add calculation array is a carry save adder, and the two terms outputted from the multiply-add calculation array are a carry part and a sum part.

3. A multiply-add unit according to claim 1, wherein:
the multiply-add calculation array is a redundant binary adder, and the two terms outputted from the multiply-add calculation array are a positive number part and a negative number part.

4. A multiply-add unit according to claim 1, wherein the leading digit detector unit further comprises:

means for judging whether the leading digit is always at any one of the addend higher digits or is not always at any one of the addend higher digits; and means for judging whether a sign of a product of the multiplicand and multiplier and a sign of the addend are the same sign or different signs, wherein each of said first and second detection portions includes means for judging whether the leading non-zero digit among absolute values of the mantissas of the multiply-add calculation result before normalization is the highest digit of the addend higher digits or a digit that is one digit lower than the highest digit of the addend higher digits, respectively depending on whether the signs of the product and addend are the same sign or different signs, and if the leading digit is always at any one of the addend higher digits.

5. A multiply-add unit according to claim 1, wherein the leading digit detector unit detects the leading digit with a maximum possible one digit error, and the multiply-add unit further comprises means for selectively shifting by one digit the mantissa of the multiply-add calculation result after normalization, in accordance with the leading digit detected by the leading digit detector unit supplied from the normalizing unit.

6. A multiply-add unit according to claim 5, wherein the leading digit detector unit further comprises:
means for judging whether the leading digit is always at any one of the addend higher digits or is not always at any one of the addend higher digits; and
means for judging whether a sign of a product of the multiplicand and multiplier and a sign of the addend are the same sign or different signs, wherein each of said first and second detection portions includes means for detecting the leading non-zero digit among absolute values of the mantissas of the multiply-add calculation result before normalization, by sequentially checking downward digit pairs of a corresponding digit position of each of the two terms supplied from the multiplier array, depending on whether the signs of the product and addend are the same sign or different signs, and if the leading digit is not always at any one of the addend higher digits.

7. A data processing apparatus, comprising:
an execution unit having a multiply-add unit for performing a multiply-add calculation of a multiplicand, a multiplier, and an addend, the multiply-add unit comprising:
a digit alignment shift number generator unit for obtaining a digit alignment shift number and an exponent of a multiply-add calculation result before normalization, in accordance with an exponent of the multiplicand, an exponent of the multiplier, and an exponent of the addend;
an addend digit alignment unit for shifting and outputting a mantissa of the addend in accordance with the digit alignment shift number;
a multiply-add calculation array for receiving a mantissa of the multiplicand and a mantissa of the multiplier, and a mantissa of the addend supplied from the addend digit alignment unit, performing a multiply-add calculation of these mantissas, and outputting two terms;
a leading digit detector unit for receiving the two terms supplied from the multiply-add calculation array, and in accordance with the two terms, detecting the leading non-zero digit among absolute values of the mantissas of the multiply-add calculation result before normalization, said leading digit detector unit having a determining portion for determining whether a sum of said two terms is positive or negative, a first detection portion for detecting which digit is the leading non-zero digit among the absolute values of the mantissas of the multiply-add calculation result before normalization based on said two terms when it is determined that said sum is positive, and a second detection portion for detectin which-digit is the leading non-zero digit among the absolute values of the mantissa of the multiply-add calculation result before normalization based on said two terms when it is determined that said sum is negative, whereby the leading non-zero digit is finally determined upon the initial detection of a leading non-zero digit by the leading digit detector unit, whether the initial detection is made by the first detection portion or by the second detection portion;

a carry propagate adder unit for receiving the two terms from the multiply-add calculation array; in accordance with the two terms, performing a carry propagate addition operation in parallel with a leading digit detection operation of the leading digit detector unit; and outputting a mantissa of the multiply-add calculation result before normalization;

a normalizing unit for normalizing the matissa of the multiply-add calculation result before normalization supplied from the carry propagate adder unit in accordance with the leading digit detected by the leading digit detector unit, and obtaining a normalized mantissa of the mnultiply-add calculation resulit; and an exponent normalizing unit for normalizing the exponent of the multiply-add calculation result before normalization supplied from the digit alignment shift number generator unit in accordance with the leading digit detected by the leading digit detector unit, and obtaining a normalized exponent of the multiply-add calculation result, a memory for storing information necessary for execution; and an instruction fetch unit for reading the information from the memory and supplying the decoded information to the execution unit, wherein the multiply-add unit performs a multiply-add calculation of the multiplicand, multiplier, and addend in accordance with the decoded information.

8. A multiply-add unit for performing a multiply-add calculation of a multiplicand, a multiplier, and an addend, comprising:
a digit alignment shift number generator unit for obtaining a digit alignment shift number and an exponent of a multiply-add calculation result before normalization, in accordance with an exponent of the multiplicand, an exponent of the multiplier, and an exponent of the addend;
an addend digit alignment unit for outputting a first mantissa of the addend essentially consisting of higher digits determined not to be subjected to a calculation by a multiply-add calculation array in accordance with the digit alignment shift number, as a subpart of the mantissa of the addend, and shifting and outputting a second mantissa of the addend essentially consisting of digits of the mantissa of the addend excepting the first mantissa of the addend, in accordance with the digit alignment shift number;
the multiply-add calculation array receiving a mantissa of the multiplicand and a mantissa of the multiplier, and the second mantissa of the addend supplied from the addend digit alignment unit, performing a multiply-add calculation of these mantissas, and outputting two terms;
a carry propagate adder unit for receiving the two terms from the multiply-add calculation array; in accordance with the two terms, performing a carry propagate addition operation; and outputting a lower mantissa of the multiply-add calculation result before normalization;

a leading digit detector unit for receiving either the two terms supplied from the multiply-add calculation array or the lower mantissa of the mualtiply-add calculation result before normalization and the digit alignment shift number, and in accordance with either the two terms or the lower mantissa and the digit alignment shift number, detecting the leading non-zero digit among absolute values of the mantissas of the multiply-add calculation result before normalization said leading-digit detector unit having a detealaino portion for determining whether a sum of said two terms or of said lower mantissa and digit alignment shift number is positive or negative, a first detection portion for detecting which digit is the leading non-zero digit among the absolute values of the mantissas of the multiply-add calculation result before normalization based on said two terms or on said lower mantissa and digit alignment shift number when it is determined that said sum is positive, and a second detection portion for detecting which digit is the leading non-zero digit among the absolute values of the mantissas of the multiply-add calculation result before normalization based on said two terms or on said lower mantissa and digit alignment shift number when it is determined that said sum is negative, whereby the leading non-zero digit is finally determined upon the initial detection of a leading non-zero digit by the leading digit detector unit, whether the initial detection is made by the first detection portion or by the second detection portion;

a normalizing unit for normalizing a lower mantissa of the multiply-add calculation result before normalization supplied from the carry propagate adder unit in accordance with the leading digit detected by the leading digit detector unit, and obtaining a normalized lower mantissa of the multiply-add calculation result;

an addend higher digit incrementer for selectively incrementing the first mantissa of the addend supplied from the addend digit alignment unit, in accordance with a carry from the carry propagate adder unit;

means for obtaining a normalized mantissa of the multiply-add calculation result from a logical sum between the normalized lower mantissa of the multiply-add calculation result supplied from the normalizing unit and the first mantissa of the addend incremented by the addend higher digit incrementer; and an exponent normalizing unit for normalizing the exponent of the multiply-add calculation result before normalization supplied from the digit alignment shift number generator unit in accordance with the leading digit detected by the leading digit detector unit, and obtaining a normalized exponent of the multiply-add calculation result.

9. A multiply-add unit according to claim 8, wherein:
the multiply-add calculation array is a carry save adder, and the two terms outputted from the multiply-add calculation array are a carry part and a sum part.

10. A multiply-add unit according to claim 8, wherein:
the multiply-add calculation array is a redundant binary adder, and the two terms outputted from the multiply-add calculation array are a positive number part and a negative number part.

11. A multiply-add unit according to claim 8, wherein the leading digit detector unit further comprises:

means for judging whether the leading digit is always at any one of the addend higher digits or is not always at any one of the addend higher digits; and means for judging whether a sign of a product of the multiplicand and multiplier and a sign of the addend are the same sign or different signs;

wherein each of said first and second detection portions includes means for judging that the leading non-zero digit among absolute values of the mantissas of the multiply-add calculation result before normalization is the highest digit of the addend higher digits or a digit that is one digit lower than the highest digit of the addend higher digits, respectively depending on whether the signs of the product and addend are the same sign or different signs, and if the highest digit is always at any one of the addend higher digits.

12. A multiply-add unit according to claim 8, wherein the leading digit detector unit detects the leading digit with a maximum possible one digit error, and the multiply-add unit further comprises means for selectively shifting by one digit the mantissa of the multiply-add calculation result after normalization, in accordance with the leading digit detected by the leading digit detector unit supplied from the normalizing unit.

13. A multiply-add unit according to claim 12, wherein the leading digit detector unit further comprises:

means for judging whether the leading digit is always at any one of the addend higher digits or is not always at any one of the addend higher digits; and means for judging whether a sign of a product of the multiplicand and multiplier and a sign of the addend are the same sign or different signs;

wherein each of said first and second detection portions includes means for detecting the leading non-zero digit among absolute values of the mantissas of the multiply-add calculation result before normalization, by sequentially checking downward digit pairs of a corresponding digit position of each of the two terms supplied from the multiplier array or each of the lower mantisfa and digit alignment shift number, depending on whether the signs of the product and addend are the same sign or different signs, and if the leading digit is not always at any one of the addend higher digits.

14. A data processing apparatus, comprising:
an execution unit having a multiply-add unit for performing a multiply-add calculation of a multiplicand, a multiplier, and an addend, the multiply-add unit comprising:

a digit alignment shift number generator unit for obtaining a digit alignment shift number and an exponent of a multiply-add calculation result before normalization, in accordance with an exponent of the multiplicand, an exponent of the multiplier, and an exponent of the addend;

an addend digit alignment unit for outputting a first mantissa of the addend essentially consisting of higher digits determined not to be subjected to a calculation by a multiply-add calculation array in accordance with the digit alignment shift number, as a subpart of the mantissa of the addend, and shifting and outputting a second mantissa of the addend essentially consisting of digits of the mantissa of the addend excepting the first mantissa of the addend, in accordance with the digit alignment shift number;

the multiply-add calculation array receiving a mantissa of the multiplicand and a mantissa of the multiplier, and the second mantissa of the addend supplied from the addend digit alignment unit, performing a multiply-add calculation of these mantissas, and outputting two terms;

a carry propagate adder unit for receiving the two terms from the multiply-add calculation array; in accordance with the two terms, performing a carry propagate addition operation; and outputting a lower mantissa of the multiply-add calculation result before normalization;

a leading digit detector unit for receiving either the two terms supplied from the multiply-add calculation array or the lower mantissa of the multiply-add calculation result before normalization and the digit alignment shift number, and in accordance with either the two terms or the lower mantissa and the digit alignment shift number, detecting the leading non-zero digit among absolute values of the mantissas of the multiply-add calculation result before normalization, said leadinct digit detector unit having a determining portion for determining whether a sum of said two terms or lower mantissa and digit alicnment shift number is positive or negative, a first detection portion for detecting which digit is the leading non-zero digit among the absolute values of the mantissas of the multiply-add calculation result before normalization based on said two terms or said lower mantissa and digit alignment shift number when it is determined that said sum is positive, and a second detection yortion for detecting which digit is the leading non-zero digit among the absolute values of the mantissas of the multiply-add calculation result before normalization based on said two terms or said lower mantissa and digit alignment shift number when it is determined that said sum is negative, whereby the leading on-zero digit is finally determined upon the initial detection of a leading non-zero digit by the leading digit detector unit, whether the initial detection is made by the first detection portion or by the second detection portion;

a normalizing unit for normalizing a lower mantissa of the multiply-add calculation result before normalization supplied from the carry propagate adder unit in accordance with the leading digit detected by the leading digit detector unit, and obtaining a normalized lower mantissa of the multiply-add calculation result;

an addend higher digit incrementer for selectively incrementing the first mnantissa of the addend supplied from the addend digit alignment unit, in accordance with a carry from the carry propagate adder unit;

means for obtaining a normalized mantissa of the multiply-add calculation result from a logical sum between the normalized lower mantissa of the multiply-add calculation result supplied from the normalizing unit and the first mantissa of the addend incremented by the addend higher digit incrementer, and an exponent normalizing unit for normalizing the exponent of the multiply-add calculation result before normalization supplied from the digit alignment shift number generator unit in accordance with the leading digit detected by the leading digit detector unit, and obtaining a normalized exponent of the multiply-add calculation result;

a memory for storing information necessary for execution; and an instruction fetch unit for reading the information from the memory and supplying the decoded information to the execution unit, wherein the multiply-add unit performs a multiplyadd calculation of the multiplicand, multiplier, and addend in accordance with the decoded information.

15. A multiply-add unit for performing a multiply-add calculation of a multiplicand, a multiplier, and an addend, comprising:

a digit alignment shift number generator unit for obtaining a digit alignment shift number and an exponent of a multiply-add calculation result before normalization, in accordance with an exponent of the multiplicand, an exponent of the multiplier, and an exponent of the addend;

an addend digit alignment unit for shifting and outputting a mantissa of the addend in accordance with the digit alignment shift number;

a multiply-add calculation array for receiving a mantissa of the multiplicand and a mantissa of the multiplier, and a mantissa of the addend supplied from the addend digit alignment unit, performing a multiply-add calculation of these mantissas, and outputting two terms;

a leading digit detector unit for receiving the two terms supplied from the multiply-add calculation array, and in accordance with the two terms, detecting the leading non-zero digit among absolute values of the mantissas of the multiply-add calculation result before normalization. said leading digit detector unit having a determining portion for, at a time of detecting a leading non-zero-digit by checking a digit pair at each corresponding digit position of said two terms from the highest digit determinin whether a sum of said two terms is positive or negative, a first detection portion for detecting which digit is the leading non-zero digit among the absolute values of the mantissas of the multiply-add calculation result before normalization based on said two terms when it is determined that said sum is positive, and a second detection portion for detecting which digit is the leading non-zero digit among the absolute values of the mantissas of the multiply-add calculation result before normalization based on said two terms when it is determined that said sum is negative, whereby the leading non-zero digit is finally determined upon the initial detection of a leading non-zero digit by the leading digit detector unit, whether the initial detection is made by the first detection portion or by the second detection portion;

a carry propagate adder unit for receiving the two terms from the multiply-add calculation array; in accordance with the two terms, performing a carry propagate addition operation in parallel with a leading digit detection operation of the leading digit detector unit; and outputting a mantissa of the multiply-add calculation result before normalization;

a normalizing unit for normalizing a mantissa of the multiply-add calculation result before normalization supplied from the carry propagate adder unit in accordance with the leading digit detected by the leading digit detector unit, and obtaining a normalized mantissa of the multiply-add calculation result; and an exponent normalizing unit for normalizing the exponent of the multiply-add calculation result before normalization supplied from the digit alignment shift number generator unit in accordance with the leading digit detected by the leading digit detector unit, and obtaining a normalized exponent of the multiply-add calculation result.

16. A multiply-add unit for performing a multiply-add calculation of a multiplicand, a multiplier, and an addend, comprising:

a digit alignment shift number generator unit for obtaining a digit alignment shift number and an exponent of a multiply-add calculation result before normalization, in accordance with an exponent of the multiplicand, an exponent of the multiplier, and an exponent of the addend;

an addend digit alignment unit for outputting a first mantissa of the addend essentially consisting of higher digits determined not to be subjected to a calculation by a multiply-add calculation array in accordance with the digit alignment shift number, as a support of the mantissa of the addend, and shifting and outputting a second mantissa of the addend essentially consisting of digits of the mantissa of the addend excepting the first mantissa of the addend, in accordance with the digit alignment shift number;

the multiply-add calculation array receiving a mantissa of the multiplicand, a mantissa of the multiplier, and the second mantissa of the addend supplied from the addend digit alignment unit, performing a multiply-add calculation of these mantissas, and outputting two terms;

a carry propagate adder unit for receiving the two terms from the multiply-add calculation array; in accordance with the two terms, performing a carry propagate addition operation; and outputting a lower mantissa of the multiply-add calculation result before normalization;

a leading digit detector unit for receiving either the two terms supplied from the multiply-add calculation array or the lower mantissa of the multiply-add calculation result before normalization and the digit alignment shift number, and in accordance with either the two terms or the lower mantissa and the digit alignment shift number, detecting the leading non-zero digit among absolute values of the mantissas of the multiply-add calculation result before normalization, said leading digit detector unit having a determining portion for, at a time of detecting a leading non-zero digit by checking a digit pair at each corresponding digit position of said two terms from the highest digit determining whether a sum of said two terms or of said lower mantissa and digit alignment shift number is positive or negative, a first detection nortion for detecting which digit is the leading non-zero digit among the absolute values of the mantissas of the multiply-add calculation result before normalization based on said two terms or on said lower mantissa and digit alignment shift number when it is determined that said sum is positive, and a second detection portion for detecting which digit is the leading non-zero digit among the absolute values of the mantissas of the multiply-add calculation result before normalization based on said two terms or on said lower mantissa and digit alignment shift number when it is determined that said sum is negative, whereby the leading non-zero digit is finally determined upon the initial detection of a leading non-zero digit by the leading digit detector unit, whether the initial detection in made by the first detection portion or by the second detection portion;

a normalizing unit for normalizing a lower mantissa of the multiply-add calculation result before normalization supplied from the carry propagate adder unit in accordance with the leading digit detected by the leading digit detector unit, and obtaining a normalized lower mantissa of the multiply-add calculation result;

an addend higher digit incrementer for selectively incrementing the first mantissa of the addend supplied from the addend digit alignment unit, in accordance with a carry from the carry propagate adder unit;

means for obtaining a normalized mantissa of the multiply-add calculation result from a logical sum between the normalized lower mantissa of the multiply-add calculation result supplied from the normalizing unit and the first mantissa of the addend incremented by the addend higher digit incrementer; and an exponent normalizing unit for normalizing the exponent of the multiply-add calculation result before normalization supplied from the digit alignment shift number generator unit in accordance with the leading digit detected by the leading digit detector unit, and obtaining a normalized exponent of the multiply-add calculation result.

* * * * *